US008046702B2

(12) United States Patent
Endoh

(10) Patent No.: US 8,046,702 B2
(45) Date of Patent: Oct. 25, 2011

(54) SCREEN EDITING APPARATUS, SCREEN EDITING METHOD, AND COMPUTER PROGRAM PRODUCT

(75) Inventor: Tsuyoshi Endoh, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 764 days.

(21) Appl. No.: 12/117,882

(22) Filed: May 9, 2008

(65) Prior Publication Data

US 2008/0307329 A1 Dec. 11, 2008

(30) Foreign Application Priority Data

Jun. 8, 2007 (JP) ................................. 2007-153198

(51) Int. Cl.
*G06F 3/00* (2006.01)

(52) U.S. Cl. ......... 715/762; 715/764; 715/204; 715/243

(58) Field of Classification Search .................. 715/762, 715/764, 204, 243, 255, 273
See application file for complete search history.

(56) References Cited

U.S. PATENT DOCUMENTS 5,689,662 A * 11/1997 Nakajima et al. ............. 715/765
5,727,135 A * 3/1998 Webb et al. .................. 358/1.14
5,761,646 A * 6/1998 Frid-Nielsen et al. ............ 705/9
6,275,226 B1 * 8/2001 Uchida et al. ................. 715/744
6,760,755 B1 * 7/2004 Brackett ....................... 709/214
7,155,504 B1 * 12/2006 Fujieda ......................... 709/224
2003/0067490 A1 * 4/2003 Murakami .................... 345/771
2004/0113941 A1 * 6/2004 Sliwa et al. ................... 345/744
2005/0088681 A1 * 4/2005 Hosoda ........................ 358/1.14
2006/0170984 A1 * 8/2006 Matsuda ....................... 358/462
2007/0013969 A1 * 1/2007 Mori ............................ 358/452
2007/0176946 A1 * 8/2007 Matoba ......................... 345/619
2007/0300216 A1 * 12/2007 Miyagi ......................... 717/168

FOREIGN PATENT DOCUMENTS

JP 2003-5825 1/2003
JP 2003-150971 5/2003
JP 2005-045370 2/2005
JP 2006-260085 9/2006

* cited by examiner

*Primary Examiner* — Tadeese Hailu
(74) *Attorney, Agent, or Firm* — Oblon, Spivak, McClelland, Maier & Neustadt, L.L.P.

(57) ABSTRACT

An attribute storing unit stores a type attribute indicating a type of a selection component for defining how a selection component having a plurality of options is to be displayed and a display attribute indicating a display status of an operation component representing each of the options. A display attribute modifying unit modifies a value of the display attribute according to an operation from a user. When the display attribute of any of the options is changed, a type attribute modifying unit modifies the type attribute of the selection component having the option to a value according to number of the options whose display attributes are set to be displayed.

18 Claims, 18 Drawing Sheets

FIG. 7

| VALUES OF TYPE ATTRIBUTE | EXAMPLES OF DISPLAYED CONTENTS |
|---|---|
| ALTERNATIVE FORMAT | SINGLE-SIDED ORIGINAL / DOUBLE-SIDED ORIGINAL<br>OR<br>SINGLE-SIDED ORIGINAL / DOUBLE-SIDED ORIGINAL |
| SELECTIVE FORMAT | STAPLE 1 / STAPLE 2<br>OR<br>STAPLE 1 / STAPLE 2<br>OR<br>STAPLE 1 / STAPLE 2 |
| TOGGLE FORMAT | SORTING OR SORTING |
| FEEDBACK FORMAT | LARGE VOLUME ORIGINAL |
| ALARMING FORMAT | ! SHOWS ATTRIBUTE MIGHT BE SET TO HIDE |
| HIDE FORMAT | |

SCREEN EDITING APPARATUS, SCREEN EDITING METHOD, AND COMPUTER PROGRAM PRODUCT

CROSS-REFERENCE TO RELATED APPLICATIONS

The present application claims priority to and incorporates by reference the entire contents of Japanese priority document 2007-153198 filed in Japan on Jun. 8, 2007.

BACKGROUND OF THE INVENTION

1. Field of the Invention

The present invention relates to a screen editing apparatus that edits contents of an operation screen to be displayed on a displaying unit, a screen editing method that edits contents of an operation screen to be displayed on a displaying unit, and a computer program to cause a computer to function as the screen editing apparatus.

2. Description of the Related Art

It has been known to use a graphical user interface (GUI) screen to display various data thereon or to receive user operations therefrom on a displaying unit.

A GUI can be designed by arranging various components on a screen. Examples of such components include a button that receives a user operation and a frame that displays characters for presenting the user with set contents. Recently, demands for GUI customization are increasing, to allow a user to edit the contents of a GUI screen to create a GUI suitable for their own applications, instead of just to use a GUI provided by a manufacturer.

Japanese Patent Application Laid-Open No. 2005-45370, 2003-150971, and 2003-5825 for example, are known as examples of the GUI customization technologies.

The Japanese Patent Application Laid-Open No. 2005-45370 discloses an image forming apparatus that enables a user to make modifications to a screen that is to be displayed on a liquid crystal displaying unit. By selecting a panel customization mode, the user can make modifications to a screen, such as whether to show or hide, a position, or a size of a function keys on a screen.

The Japanese Patent Application Laid-Open No. 2003-150971 describes a technology that enables a user to edit an operation screen of an electronic device by accessing a server from a user terminal. Examples of the available edits include enlarging/reducing the size of, segmenting, combining, changing position of, or killing (eliminating) a function of an operation button.

The Japanese Patent Application Laid-Open No. 2003-5825 describes industrial equipment that enables a user to customize a GUI by correcting an HTML file defining a layout of a screen.

A plurality of components that are interrelated to each other may be displayed on the GUI. For example, a plurality of buttons may be provided to receive a user selection of set contents from a plurality of options associated therewith. There is also a demand for hiding some of the buttons to limit the available function, so that a user is prohibited from choosing the corresponding options.

However, if those buttons corresponding to only some of the options are hidden, the remaining buttons sometimes can appear unnatural. For example, consider that one of the options must be always selected. If the buttons corresponding to the all of the options are hidden except for the one corresponding to one of the options, that button might appear as if a user can make some operation thereto on the GUI, regardless of the remaining options are substantially chosen. The same thing can be said for other operating elements other than a button.

No technology has been known to solve this problem in an appropriate manner.

SUMMARY OF THE INVENTION

It is an object of the present invention to at least partially solve the problems in the conventional technology.

According to an aspect of the present invention, there is provided an apparatus for editing an operation screen to be displayed on a display unit, including an attribute storing unit that stores therein a type attribute indicating a type of a selection component for defining how the selection component having a plurality of options is to be displayed on the operation screen and a display attribute indicating a display status of an operation component representing each of the options; a display attribute modifying unit that modifies a value of the display attribute stored in the attribute storing unit according to an operation from a user; and a type attribute modifying unit that modifies, when a value of the display attribute of any of the options is changed, the type attribute of the selection component having the option to an appropriate value depending on number of the options whose display attributes are set to show.

Furthermore, according to another aspect of the present invention, there is provided a method of editing an operation screen to be displayed on a display unit, including storing a type attribute indicating a type of a selection component for defining how the selection component having a plurality of options is to be displayed on the operation screen and a display attribute indicating a display status of an operation component representing each of the options; modifying a value of the display attribute according to an operation from a user; and modifying, when a value of the display attribute of any of the options is changed, the type attribute of the selection component having the option to an appropriate value depending on number of the options whose display attributes are set to be displayed.

Moreover, according to still another aspect of the present invention, there is provided a computer program product comprising a computer-usable medium having computer-readable program codes embodied in the medium that when executed cause a computer to execute storing a type attribute indicating a type of a selection component for defining how the selection component having a plurality of options is to be displayed on the operation screen and a display attribute indicating a display status of an operation component representing each of the options; modifying a value of the display attribute according to an operation from a user; and modifying, when a value of the display attribute of any of the options is changed, the type attribute of the selection component having the option to an appropriate value depending on number of the options whose display attributes are set to be displayed.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 7 is a diagram of values that are settable as a type attribute of a selection component included in the screen configuration information shown in FIG. 6, and representations of each of the values, being set as the type attribute, on the screen;

DETAILED DESCRIPTION OF THE PREFERRED EMBODIMENTS

Exemplary embodiments of the present invention will be explained in detail below with reference to the accompanying drawings.

A screen editing apparatus according to an embodiment of the present invention enables a user to edit contents of an operation screen that is to be displayed on a displaying unit of some kind of apparatus. The screen editing apparatus may be realized by providing a screen editing function to the operation screen displaying apparatus itself, or causing a computer, such as a personal computer (PC), communicatable with the operation screen displaying apparatus over a communication path e.g., a network to execute a required application program.

The editing function can be realized by the operation screen displaying apparatus that functions as an application server, and is made available to a general client application, such as a web browser on a PC, accessing thereto. Alternatively, a completely independent editing apparatus may be used only to edit operation screen data and to store the data in a recording medium so that the operation screen displaying apparatus can read the operation screen data from the recording medium.

In other words, any hardware may be used to realize the screen editing apparatus as long as the hardware includes elements such as a central processing unit (CPU), a read only memory (ROM), and a random access memory (RAM), and a certain computing capacity.

In the examples described below, the screen editing apparatus is implemented as a PC. An operation screen whose contents are edited with the screen editing apparatus is displayed on the image processing apparatus connected to the PC over a network. To begin with, a configuration of the image processing apparatus will be now explained. The image processing apparatus herein represents an example of an apparatus that displays a screen based on a screen data edited by the screen editing apparatus.

Figure 1:
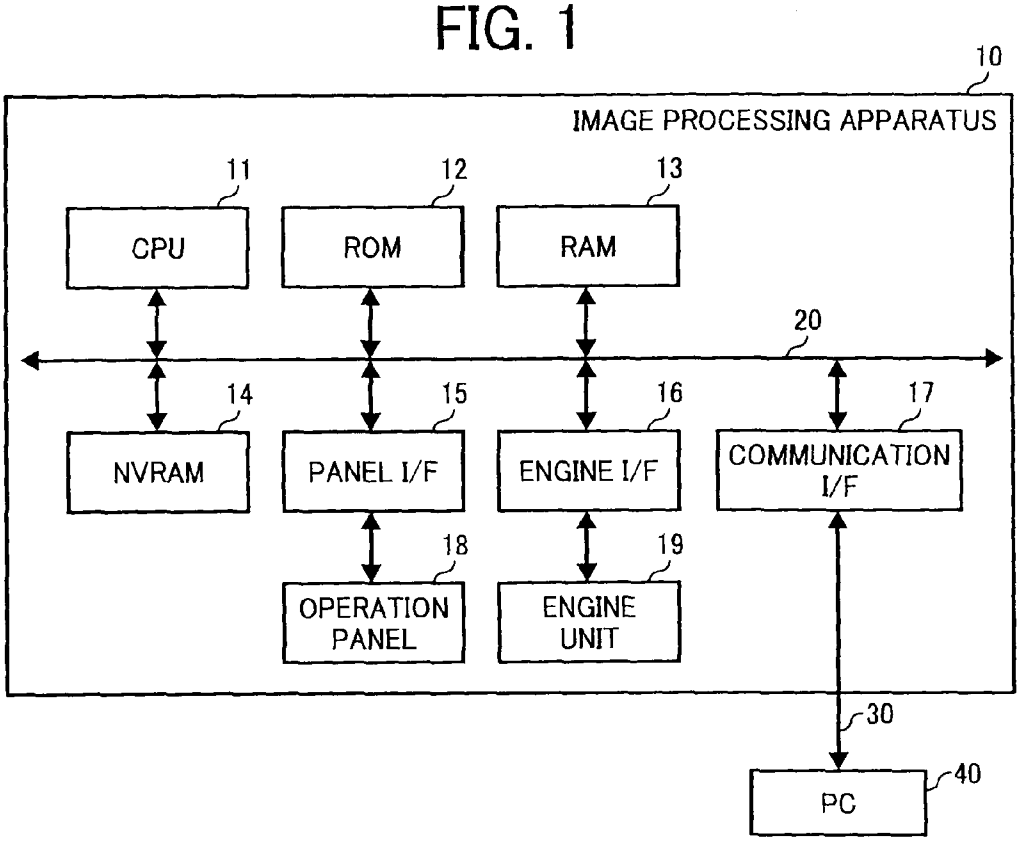
FIG. 1 is a block diagram of a hardware configuration of an image processing apparatus that represents an example of an apparatus that displays a screen based on screen data edited by a screen editing apparatus according to an embodiment of the present invention.
Figure 2:
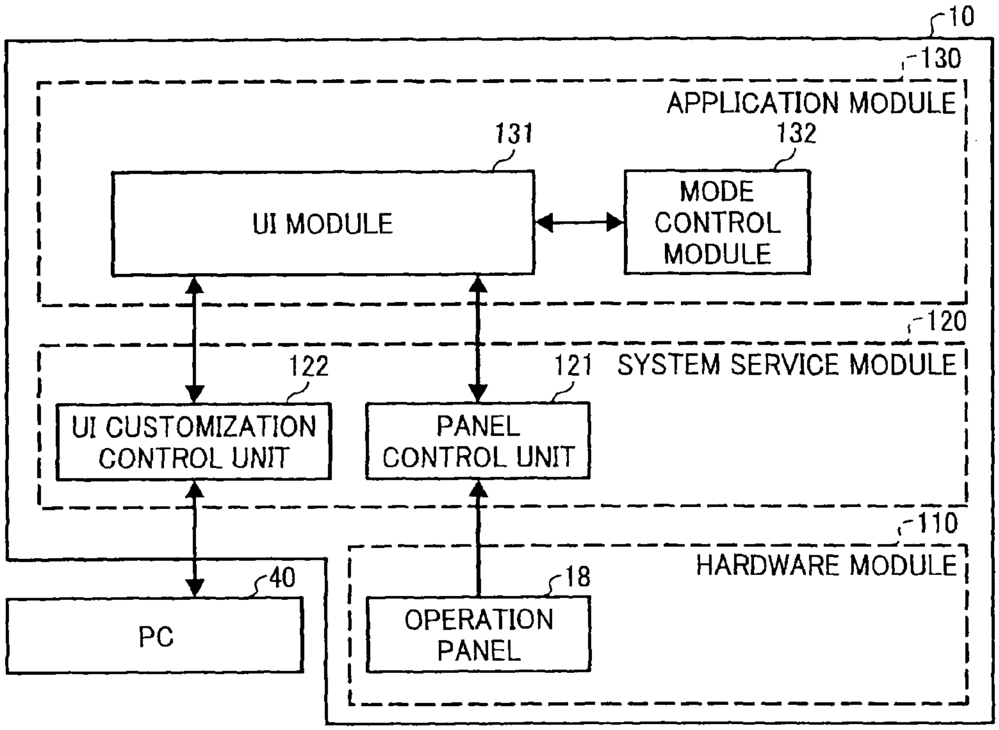
FIG. 2 is a functional block diagram of a configuration of functions relating to setting change performed by a GUI operation and customization of the GUI, among the functions provided to the image processing apparatus shown in FIG. 1.

FIG. 1 is a block diagram of a hardware configuration of an image processing apparatus, and FIG. 2 is a diagram of a functional configuration thereof.

As shown in FIG. 1, an image processing apparatus 10 includes an engine unit 19 and a communication interface (I/F) 17. The engine unit 19 further includes a printer engine, a scanner engine, and a hard disk drive (HDD) that accumulates images. The engine unit 19 and the communication I/F 17 are controlled by a controlling unit to realize functions such as a printer, a scanner, a copier, a document box, and a facsimile communication. The control unit includes a CPU 11, a ROM 12, and a RAM 13 and the like. A displaying unit, which is a liquid crystal display (LCD), has an operation panel 18 with a laminated touch panel. On the operation panel 18, a GUI is displayed to receive user operations, such as a setting or an operation instruction, for executing operations according thereto. A nonvolatile random access memory (NVRAM) 14 stores therein the data that can be changed and need to be maintained while the power is OFF, among the data such as set contents, required for the operations.

Out of these elements, the CPU 11, the ROM 12, the RAM 13, the NVRAM 14, and the communication I/F 17 are connected to a system bus 20. The operation panel 18 and the engine unit 19 are connected to the system bus 20 via a panel I/F 15 and an engine I/F 16, respectively.

The communication I/F 17 can communicate with a PC 40 over a network 30, such as a local area network (LAN). For the communication, any communication circuit may be used, including cabled and wireless circuits.

FIG. 2 is a diagram of the functions relating to setting changes performed by operating on the GUI, and those relating to GUI customization, among the functions provided to the image processing apparatus 10.

The image processing apparatus 10 generally includes a hardware module 110, a system service module 120, and an application module 130.

The hardware module 110 includes hardware resources, such as the operation panel 18, the engine, and the memory.

The system service module 120 and the application module 130 are implemented by software.

The system service module 120 is an intermediary module located between the hardware module 110 and the application module 130. The system service module 120 realizes functions to receive operation requests from the application module 130 on behalf of the hardware module 110, to perform arbitrations between the operation requests, and to control the operations based on the operation requests.

A panel control unit 121, shown in FIG. 2, functions to control the operation panel 18 to display screens thereon and to detect operations performed thereon.

A user interface (UI) customization control unit 122 functions based on a request received from an external screen editing apparatus, such as the PC 40 connected thereto over the network 30, to provide a GUI data that is used for displaying a screen on the image processing apparatus 10 to the external screen editing apparatus, so that the GUI data can be edited. The UI customization control unit 122 also functions to set the edited data to the image processing apparatus 10, so that the edited data is used in displaying the screen on the image processing apparatus 10.

The application module 130 functions to operate according to, for example, a user instruction or a command issued by an external apparatus, by controlling the hardware module 110 through the system service module 120. The application module 130 is shown in a singularity in FIG. 2; however, the application module 130 may be also provided in a plurality. For example, the application module 130 may be provided for each of the functions, such as the copier, the facsimile communication, the scanner, the printer, and the document box.

Obviously, a specific configuration of the application module 130 differs depending on the function to be achieved thereby. The one shown in FIG. 2 are functions that are commonly provided to any type of the application module 130. Out of these functions, a UI module 131 functions to monitor display/deletion of the GUI screen executed based on a user instruction, and operations performed on the GUI. When an operation is detected, the UI module 131 also functions to notify the detected operation to a mode control module 132.

The mode control module 132 functions to set an operation mode to the image processing apparatus 10 based on the operation performed on the GUI. The mode control module 132 does not only reflect the operations performed on the GUI to the operating mode as it is, but also performs a pre-prioritization, which prohibits other settings to be set if a given setting has been already set, or a post-prioritization, which cancels other specific settings when a given setting is set.

Operations of the UI module 131 and the mode control module 132 will be now explained in detail.

Figure 3:
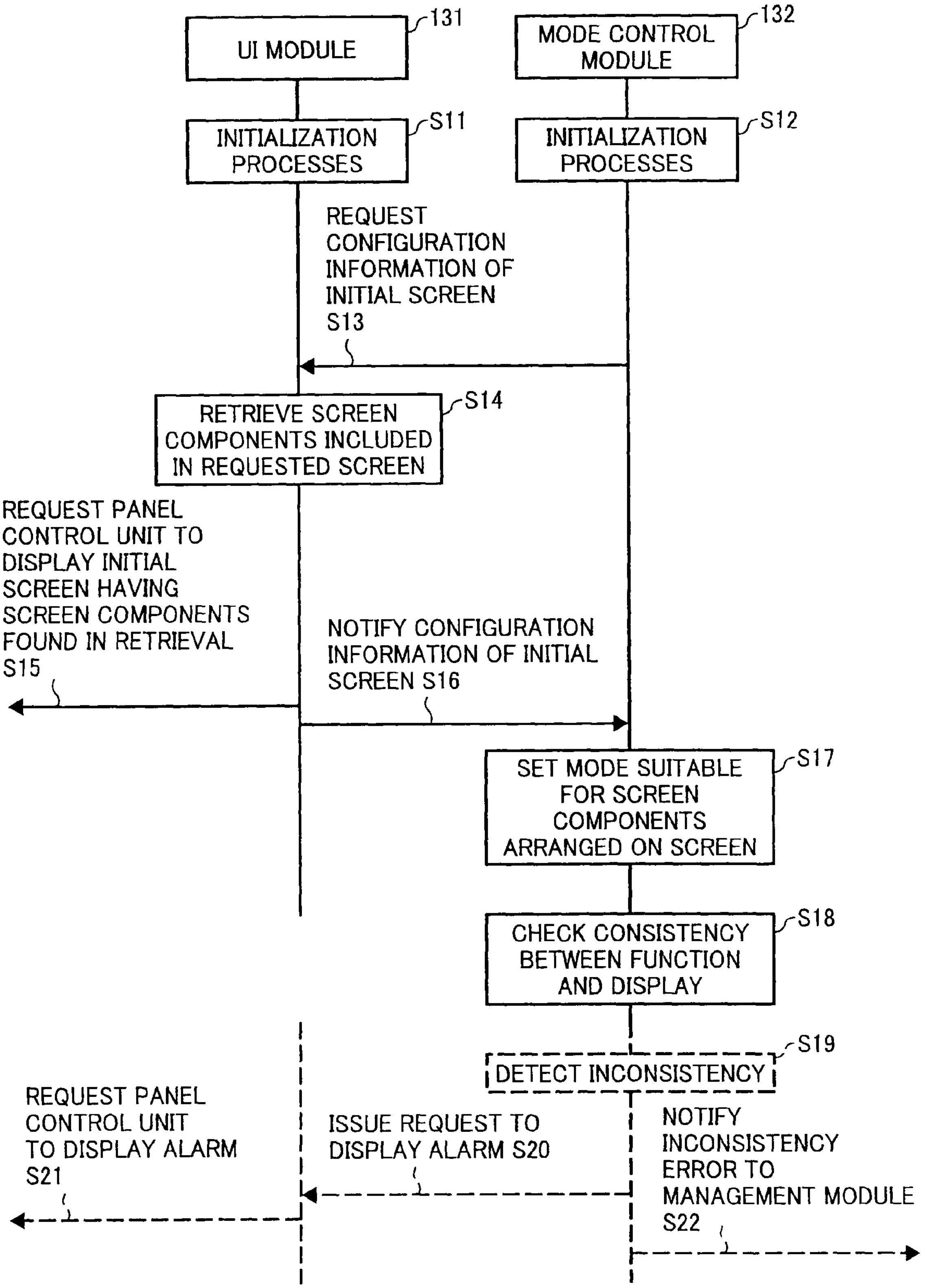
FIG. 3 is a sequence chart of operation sequences performed by a UI module and a mode control module in starting up the image processing apparatus shown in FIG. 1.

FIG. 3 is a diagram of operation sequences performed by the UI module 131 and the mode control module 132 in starting up the image processing apparatus 10.

When the image processing apparatus 10 is started up by, e.g., powered on or reset, the UI module 131 and the mode control module 132 perform predetermined initialization processes, respectively (S11, S12).

The mode control module 132 then requests configuration information of an initial screen that is to be displayed on the operation panel 18 from the UI module 131, based on the settings at startup stored in the nonvolatile memory (S13). The configuration information includes information of screen components, such as a button or a text to be arranged on the screen, display formats thereof, and positions thereof.

In response, the UI module 131 retrieves screen components included in the requested screen, from data representing contents of the displayed screens, which is to be described later (S14). The UI module 131 then requests the panel control unit 121 to display the initial screen having the screen components found in the retrieval (S15). At the same time, the UI module 131 notifies the configuration information of the initial screen to the mode control module 132 (S16).

Configuration information of each screen can be edited by the user, as will be described later. The user can disable a function by deleting (setting to hide) a button representing the function, or prohibit an option from being selected by deleting (setting to hide) a button representing the option. The user can also move or duplicate a button that has been arranged on a screen upon shipment of the apparatus from the manufacturer to the user-desired screen, or arrange a new button on a screen to instruct to perform the user-defined operation sequence or a setting to the apparatus.

Upon receiving the configuration information of the initial screen from the UI module, the mode control module 132 sets a mode suitable for the screen components to be arranged on the screen (S17). More specifically, if the screen component, such as a button, is set to be displayed on the initial screen, the mode control module 132 sets a predetermined initial value to the function corresponding to the screen component. If the screen component is set to be hidden on the initial screen, the mode control module 132 sets to disable the function corresponding thereto.

However, depending on the contents of a screen, a button could be set to be hidden even if a function corresponding thereto is required. For example, in spite that a screen is provided to receive settings relating to printing function, all buttons relating to paper tray selection could be set to be hidden. In such a situation, the mode control module 132 cannot perform a proper setting. Such a situation shall be hereinafter called as "inconsistency" between a function and a display.

When the settings are completed at the step S17, a process is performed to check for the display consistency for that function (S18). If no inconsistency is detected, the startup process is ended at this point, and the system control continues to a process for a normal operation. If the inconsistency is detected, the steps subsequent to the step S19, shown in dotted lines, are the processes executed.

If the inconsistency between a function and a display is detected (S19), the mode control module 132 requests the UI module 131 to display an alarming message, such as "You specified XX function, but no corresponding button is displayed. Do you want to cancel (or make a change for) the XX function? [YES], [NO]" (S20). Upon receiving the request, the UI module 131 requests and causes the panel control unit 121 to display the alarming message to the operation panel 18 (S21). The UI module 131 executes the step S21 independently from the processes up to the steps S16.

The mode control module 132 also notifies the inconsistency error to a management module, not shown, that controls the image processing apparatus 10 (S22). The startup process is then ended. If the user selects "YES" at the alarming message, the system control cancels or changes the setting to resolve the inconsistency, and proceeds to the process for the normal operation. If the user selects "NO", the system control automatically provides appropriate settings without displaying the button for the inconsistent function, and proceeds to the process for the normal operation.

In other words, regardless of the choice the user makes, the image processing apparatus 10 can be operated with limitations in the displayed contents of the screen. Therefore, the apparatus is prevented from being down for a long time because of the inconsistency between the function and the display.

Based on the processes, the image processing apparatus 10 can display the initial screen on the operation panel 18 at startup, as well as be ready for receiving the user operation therethrough. To change the screen displayed on the operation panel 18 to another, the UI module 131 and the mode control module 132 can perform the step S13 and the subsequent steps, shown in FIG. 2, so that the new screen is displayed on the operation panel 18.

Figure 4:
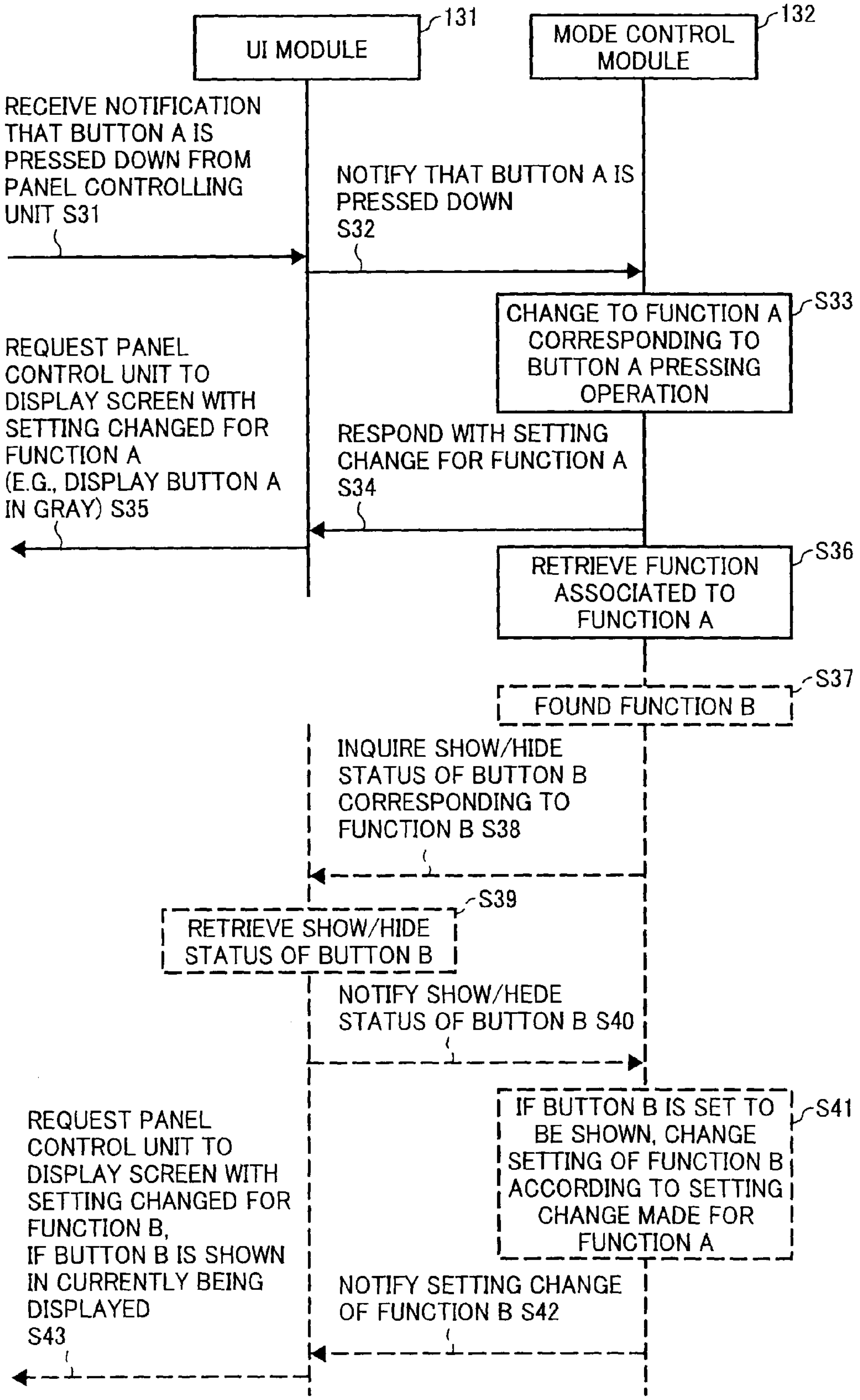
FIG. 4 is a sequence chart of operation sequences performed by the UI module and the mode control module when a user makes an operation to a button in a screen displayed on an operation panel.

FIG. 4 is a diagram of operation sequences performed by the UI module 131 and the mode control module 132 when a user makes an operation to a button in the screen displayed on the operation panel 18.

If the user makes an operation on a section having a button A in the screen displayed on the operation panel 18, for example, the panel control unit 121 detects the user operation and notifies the UI module 131, as shown in FIG. 4 (S31). The UI module 131 recognizes the button A being pressed down based on this notification, and further notifies that the button A is pressed down to the mode control module 132 (S32).

The mode control module 132 recognizes that the button A is pressed down based on the notification issued at the step S32, and makes a change to a function A corresponding to the button A for the pressing operation (S33). For example, if the button A is a toggle button for switching ON/OFF the function A, the ON/OFF status of the function A is switched. If the function A has a plurality of options, one of which is to be selected, the status of the function A is changed so that the option corresponding to the button A becomes selected.

After changing the setting at the step S33, the mode control module 132 notifies the change to the UI module 131 as a response, notifying that the setting has been changed for the function A. This notification functions as a response to the notification of the button A being pressed down (S34). In response to the response, the UI module 131 requests the panel control unit 121 to display a screen with the setting changed for the function A (S35). For example, if the function A is turned ON, the button A is displayed in gray. If another option corresponding to the button A is selected for the function A, a button corresponding to the option that had been selected previously is reset to a normal status, and the button A is displayed in gray.

The image processing apparatus 10 can make an association between a function and another so that, if a setting for one function is changed, the setting for the other function is also changed. For example, if a sorting function of output papers is cancelled, a stapling function is also cancelled in association therewith; or if a biding function is selected, a setting for a multiple-pages-per-sheet is cancelled in association therewith.

After the setting is changed at the step S33, the mode control module 132 retrieves a function associated to the function A (S36). If no associated function is found, then the system control ends the process invoked upon the button A being pressed down. If an associated function is found, a step S37 and subsequent steps shown in dotted lines are performed.

If a function B is found to be associated with the function A (S37), the mode control module 132 issues a notification to the UI module 131, inquiring a show/hide status of a button B corresponding to the function B (S38).

Upon receiving the notification, the UI module 131 retrieves the show/hide status of the button B in the data representing the displayed contents of screens including the button B (S39), and notifies the show/hide status thereof to the mode control module 132 as a response to the inquiry (S40). A show/hide status is information indicating whether a button is set to be shown, or set to be hidden on a screen. This information has nothing to do with whether the button is included in the screen currently being displayed. The button B, corresponding to the function B, may be also provided in a plurality. The processes for the steps S39, S40 executed by the UI module 131 are performed independently from the steps up to the step S35.

If the button B is set to be shown upon receiving the response at the step S40, the mode control module 132 can change the setting for the function B. Thus, the mode control module 132 changes the setting of the function B according to the change made for the function A at the step S33 (S41), and notifies the change to the UI module 131 (S42). If the button B is shown in the screen currently being displayed, in response to the notification, the UI module 131 requests the panel control unit 121 to display a screen with the setting changed for the function B, in the same manner as for the step S35 (S43).

If the button B is set to be hidden at the step S41, it means that the function B is always kept disabled (OFF). Therefore, no setting is changed for the function B in association with the setting change for the function A. Thus, the system control ends the process at this point. The same can be said when the button corresponding to the function B is provided in a plurality, and the button, corresponding to an option that is to be selected according to the setting change for the function A, is set to be hidden.

Moreover at the step S33, the mode control module 132 performs an exclusive control for a function. For example, assume that a limitation is given so that the function A is prohibited from being turned ON while a function X is ON. In this situation, if the mode control module 132 receives the notification of the button A being pressed, the setting for the function A should be turned ON. However, because the function X is set to ON, the mode control module 132 ignores the notification and does not change the setting for the function A. Therefore, this exclusive control could prevent the setting for the function A from being changed. In such a situation, the mode control module 132 notifies the UI module 131 that the setting has not been changed at the step S34.

Similar processes are executed if an operational component other than a button on the GUI is operated.

The processes enable the image processing apparatus 10 to provide settings for various functions depending on the operations performed on the screen displayed on the operation panel 18. Moreover, even if the settings for a plurality of functions are associated with each other, a function can be kept disabled or an option can be prohibited from being selected for the function corresponding to a button that is set to be hidden.

In the image processing apparatus 10, any user having a predetermined privilege can freely edit a screen to be displayed on the operation panel 18. According to the first embodiment, this editing operation can be performed by accessing the image processing apparatus 10 using a dedicated client application from the PC 40. In the image processing apparatus 10, the UI customization control unit 122, shown in FIG. 2, receives the access from the client application, and provides the data required for editing the screen.

Figure 5A:
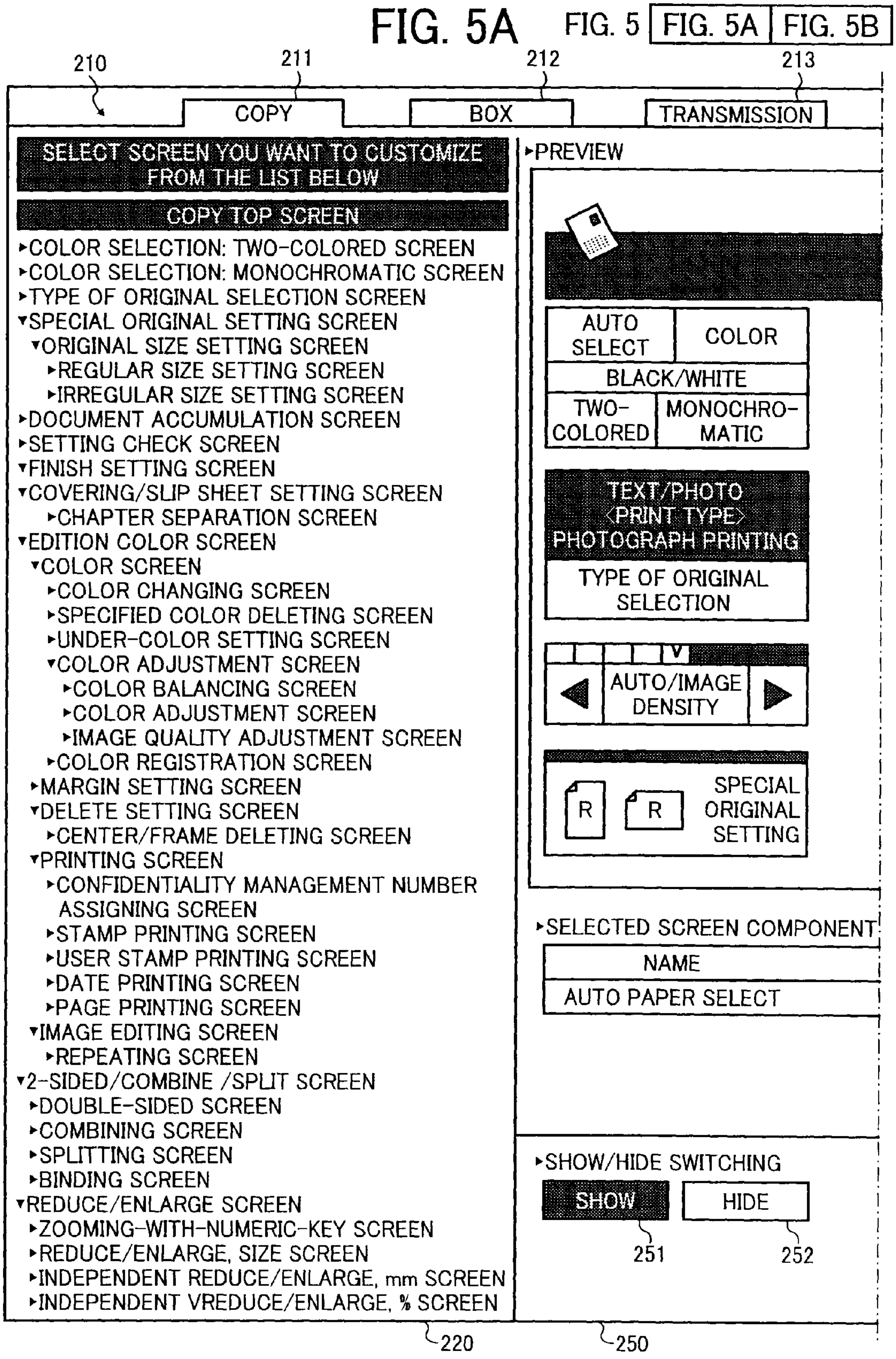
FIG. 5 is a composite of FIGS. 5A and 5B, illustrating a diagram of an exemplary GUI edition screen for a PC that is the screen editing apparatus according to the embodiment of the present invention, the GUI edition screen receiving editing operations for a screen to be displayed on the operation panel of the image processing apparatus, shown in FIG. 1.
Figure 5B:
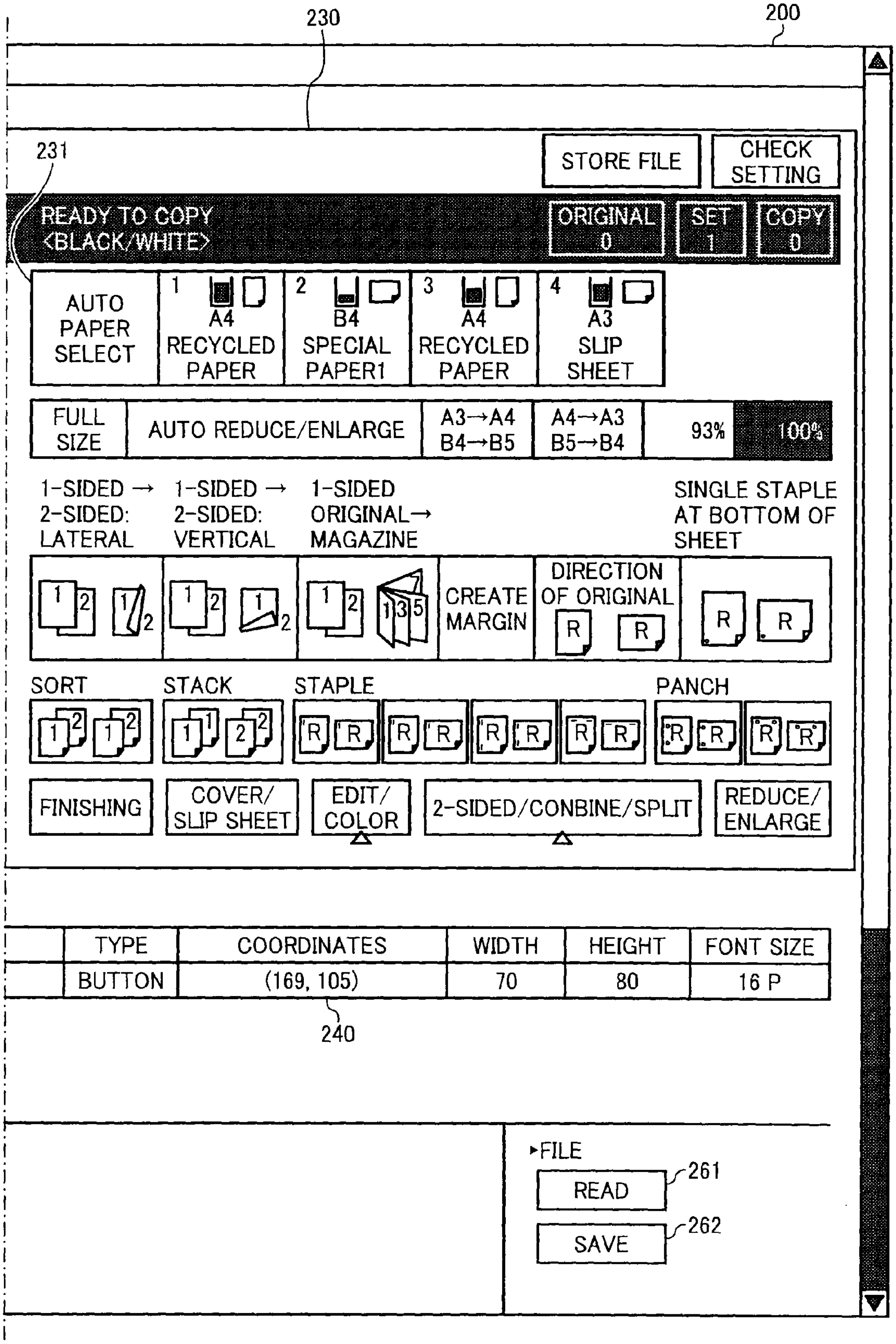

FIG. 5 is a diagram of an exemplary GUI edition screen for receiving an editing operation for a screen to be displayed on the operation panel 18.

A GUI edition screen 200, shown in FIG. 5, is displayed on a displaying unit of the PC 40 by way of a function provided to the client application running on the PC 40.

In the GUI edition screen 200, tabs 210 allow the user to select which application module (hereinafter, "application") provided to the image processing apparatus 10 to edit. In the example shown in FIG. 5, three applications including a copy application, a document box application, and an image transmission application are installed on the image processing apparatus 10. A copy tab 211, a box tab 212, and a transmission tab 213, each corresponding to each of these applications, are displayed on the GUI edition screen 200. In the example shown in FIG. 5, the user has selected the copy tab 211, to edit a GUI used for the copy application.

A screen list displaying section 220 is provided to list up GUIs used in the application that is selected on the tab 210 in a tree, and the user can select a GUI to edit from this list. Contents of the selected screen are displayed in a preview displaying section 230. In FIG. 5, a copy top screen, located at the top of the list, is shown to be selected.

The preview displaying section 230 displays a preview of a screen to be displayed on the operation panel 18 after the user makes editions. When the user wants to edit display status of an operation component, such as a button, for example, the user can select the component by clicking on the operation component in the preview displaying section 230.

A property displaying section 240 and a show/hide displaying section 250 display information relating to the current status of the edited operation component that is selected on the preview displaying section 230.

In FIG. 5, an auto paper selection button 231 is chosen, and the property displaying section 240 displays information of a name, a type, coordinates of a position, a size (a width and a height) of the button, and a font size of a label given thereto, as current information. In this information, the coordinates of the position are editable. Such an edition can be made with an editing operation component, not shown, such as a cursor button that will be displayed when the GUI edition screen 200 is scrolled. The result of the edition is immediately reflected onto the image displayed in the preview displaying section 230.

In the show/hide displaying section 250, a "show" button 251 and a "hide" button 252 are displayed to allow the user to specify whether the button to be edited is to be shown or to be hidden on the operation screen. The button corresponding to the current setting is displayed in gray. In the example shown in FIG. 5, because the auto paper selection button 231 is set to be shown, the "show" button 251 is displayed in gray. If the user presses the "hide" button 252, the auto paper selection button 231 is set to be hidden. The change in show/hide setting is also immediately reflected onto the image displayed in the preview displaying section 230.

When the show/hide setting is changed for a button representing one of the options provided to a selection component, a type of the entire selection component can be changed in association with the change of the show/hide setting. This is the main characteristic of this embodiment, and will be described later in detail. Such type change of the entire selection component, performed in association with the change in the show/hide setting of the button, is also immediately reflected onto the image in the preview displaying section 230.

If a button is set to be hidden, the button will be deleted from the preview displaying section 230, thus preventing the user from clicking thereon subsequently. Therefore, although not shown, the GUI edition screen 200 includes a button for showing a list of operation components, regardless of the show/hide setting thereof, included in the data of the screen that is selected from the screen list displaying section 220. Therefore, if the user wants to edit a hidden operation component, the user can select the component to be edited from this list.

If the user presses a save button 262, the contents of the screen edited on the GUI edition screen 200 are stored to an arbitrarily file. In response to the pressing operation on the save button 262, the edited contents may be also reflected immediately onto the screen displayed on the image processing apparatus 10.

If the user presses a read button 261, contents of a screen edited in the past may be read from the arbitrarily file so as to enable editions thereof. In response to the pressing operation on the read button 261, it is also possible to read a set of information currently being used for displaying screens on the image processing apparatus 10.

Figure 6:
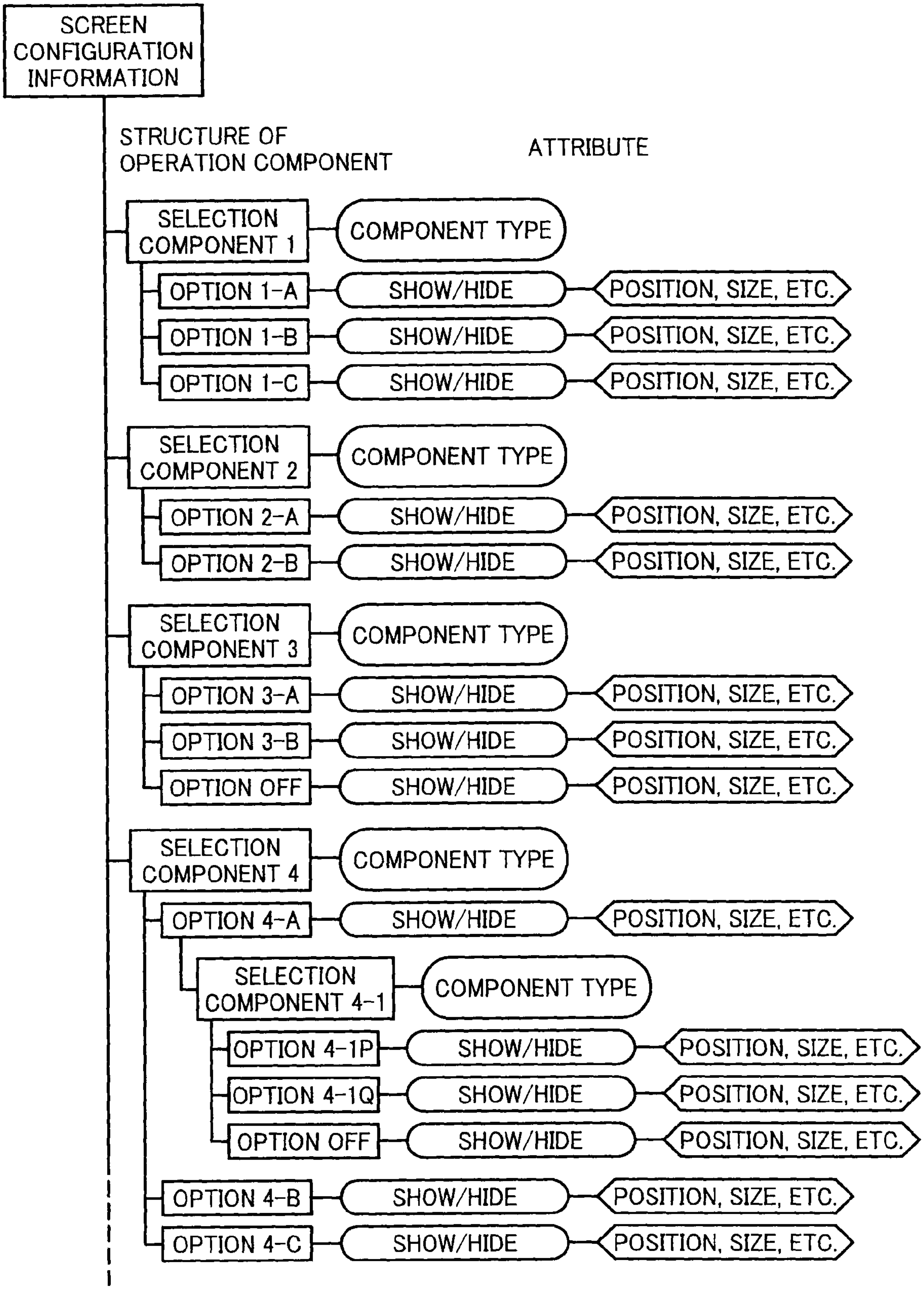
FIG. 6 is a diagram of exemplary screen configuration information showing the configuration of a single screen edited by the PC.

FIG. 6 is a diagram of exemplary screen configuration information showing the configuration of a single screen edited by the PC 40.

The screen configuration information shown in FIG. 6 defines the contents of a single GUI screen to be displayed on the operation panel 18 of the image processing apparatus 10. The GUI screen is edited by modifying this screen configuration information. Out of data showing the screen contents to be edited on the GUI edition screen 200 and displayed on the image processing apparatus 10, the data relating to the status of buttons provided for receiving the user operations are all managed as selection component data, shown in FIG. 6, in the PC 40 and the image processing apparatus 10.

In addition to the selection component data, the screen configuration information may include data, such as data representing a fixed message or image, or data representing a displaying frame for showing parameter vales to be set thereto. However, only the selection component data is relevant to the characteristic of this embodiment; therefore, the screen configuration information will be explained by being focused on the selection components.

A selection component is a unit of information provided for each of the functions provided to the image processing apparatus 10, and is used for managing the status of buttons used for providing settings to that function. The actual GUI does not necessarily display expressly which buttons are included in a selection component.

Data of each selection component can include options and a type attribute. The options represent settings that can be set to the corresponding function. The type attribute represents a format for displaying the selection component on the GUI screen. Each of the options can be further specified with its show attribute, which is a show/hide attribute of the corresponding button, and other attributes e.g., defining a position or a size thereof.

Amongst these data, the show attribute is set through the show/hide displaying section 250 on the GUI edition screen 200. The attributes such as a position or a size are displayed in the property displaying section 240; however, there may be those that are not displayed therein.

The type attribute of the selection component is automatically set by the client application that implements the GUI editing function on the PC 40, depending on the contents or the number of the options, and the show attribute setting thereof. However, it is not prohibited to temporarily turn off this auto setting, or to enable a manual setting in addition to the auto setting.

Each of the selection components may have any number of the options. The options can define specific set contents, for example, "left side" or "upper side" in the punching function, specifying the position to punch holes. The options may also include an option to turn the function OFF, that is, to disable the function. In FIG. 6, the "option OFF" shown to be belonging to a selection component 3 corresponds to this disabling function.

As can be seen in an option 4-A for a selection component 4, another selection component can be provided to an option so that the selection components are arranged hierarchically. In such an arrangement, the selection component 4 is called a higher selection component, and a selection component 4-1, corresponding to the option included in the selection component 4, is called a lower selection component. The selection components can be also arranged in three or more tiered structure. Upon arranging the selection components hierarchically, a value of the type attribute of each of the selection components should be set considering whether the selection component has a higher selection component.

FIG. 7 is a diagram of values that are settable as a type attribute of a selection component, and how the value will be represented on the screen when each of the values is set as the type attribute.

Six formats are possible for the type attribute of the selection component. As shown in FIG. 7, these formats include an alternative format, a selective format, a toggle format, a feedback format, an alarming format, and a hide format.

The alternative format is a format that displays a button representing each of the options whose show attributes are set to "show" as an operation component on the screen, and receives a user selection so that one of these options always is selected. In other words, it is not acceptable that none of the options is selected. However, it is acceptable if the "function OFF" option is selected.

FIG. 7 illustrates an operation component having two buttons corresponding to two options, "single-sided original" and "double-sided original", whose show attribute is set to "show". In this operation component, only one of these buttons can be selected and displayed being shaded. If a button that has already been selected is operated, nothing changes. If a button that has not been selected is operated, a button that has already been selected will be released, and the operated button (and the option corresponding thereto) will be selected.

The selective format is a format that displays a button representing each of the options whose show attributes are set to "show" as an operation component on the screen, and receives a user selection so that one of these options is selected at most. In other words, in comparison with the alternative format, the selective format permits the condition with none of the options being selected. When none of the options is selected, it is interpreted as an equivalent to the selection of the "function OFF", indicating that the function corresponding to the selection component is disabled.

FIG. 7 illustrates an operation component having two buttons corresponding to two options, "staple 1" and "staple 2", set to be shown. In this operation component, either one or both of these buttons can be selected. If the unselected button is operated and if a button that has already been selected is present, the selected button will be released, and the operated button (and the option corresponding thereto) will be newly selected. If the selected button is operated, the selection thereof will be released.

In the alternative and the selective formats, basically a plurality of buttons is displayed for a single selection component. However, these buttons do not necessarily have to be arranged laterally, as shown in FIG. 7. Each of the buttons may be arranged in any position with respect to the other, and each of the buttons can be specified with a position as mentioned above. Therefore, the buttons included in a single selection component may be displayed at a distance from one another.

The toggle format is a format that displays a single button as an operation component on the screen, and options associated therewith are selected by a toggle. The toggle may be switched between one of the options being selected and the function OFF, or may be switched among the options sequentially.

FIG. 7 illustrates an operation component having a button corresponding to an option, "sorting". In this operation component, the "sorting" or nothing can be selected. These two statuses can be switched by the toggle every time the button is operated.

The feedback format is a format that displays a set content set to a setting item corresponding to the selection component on the screen. In other words, the feedback format displays a value that is currently set in the setting item specified by the selection component. The set content is usually one of the options included in the selection component. The CPU 11 in the image processing apparatus 10 automatically decides as to which option is set to the setting item. In the feedback format, the selection component does not receive a user operation, and the set content thereof cannot be changed by way of a direct user operation. In the feedback format, because the set content is displayed on the screen, there is no direct relationship between the displayed set content and the show attribute of each of the options. (In some situations, the set content is determined depending on the show attribute; therefore, in this sense, it can be said that there is some relationship between the two.) FIG. 7 depicts a status where "large volume original" is set in a setting item.

The alarming format is a format that displays an alarm on a screen that some setting made to a selection component will not be displayed on the operation screen. For example, despite a function requires one of the options, but not the function OFF, to be always selected, the show attributes of the buttons corresponding to all of the options could be set to "hide". In this setting, one of the options must be selected even though no corresponding button is displayed on the operation screen. The alarming format is mainly used for giving an alarm in such a situation.

The alarming format is mainly used for giving an alarm on the preview displaying section 230 to notify the user that the current GUI content is inappropriate. Therefore, it is possible to prohibit the user from setting a screen having a selection component with the alarming format to the image processing apparatus 10. The display of the alarming format is done independently from the alarming message displayed at the step S21 shown in FIG. 3.

The hide format a format that does not display anything for the selection component on the screen, regardless of the contents of its options or the show attributes thereof. In FIG. 7, a frame with a dotted line is shown; however, actually even this frame is not displayed on the screen. The hide format can be used for making a function completely unavailable.

Figure 8:
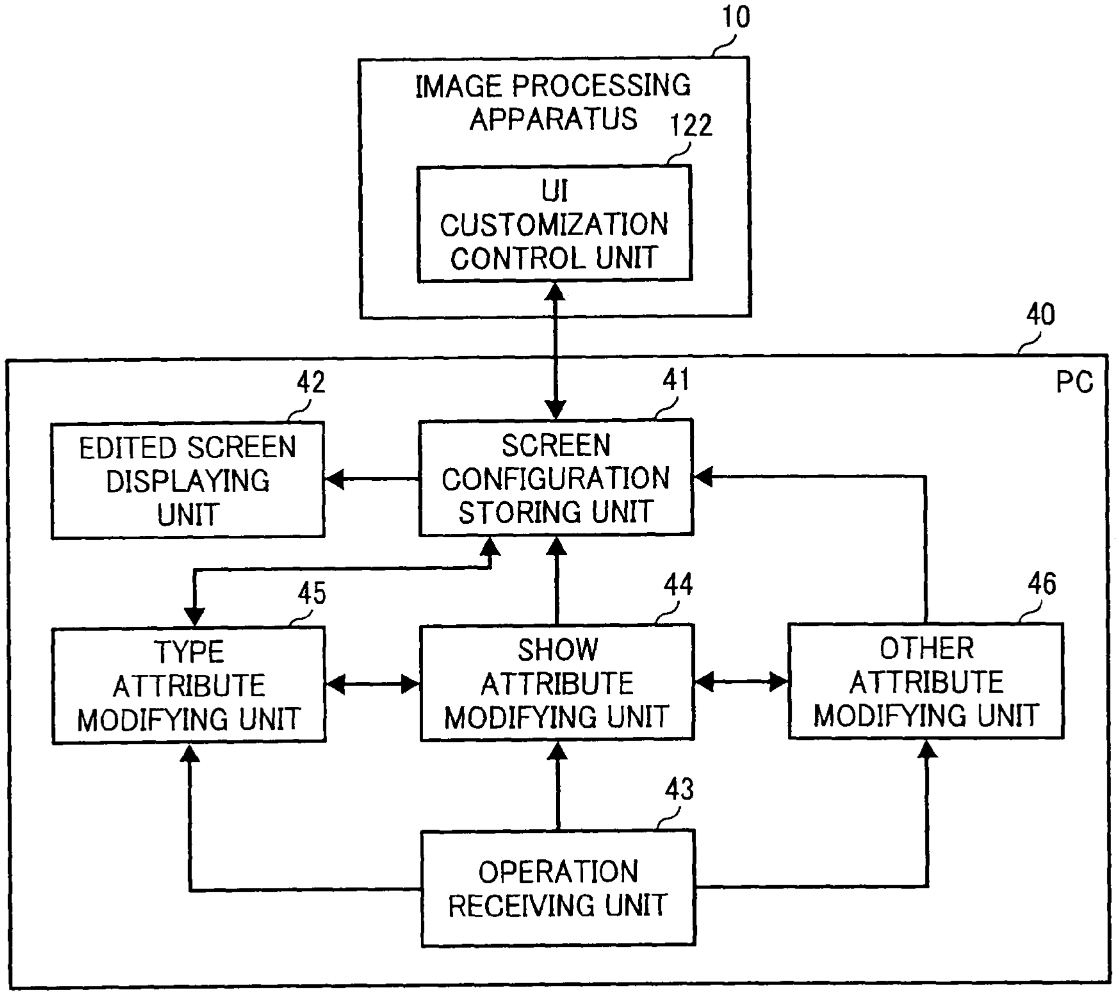
FIG. 8 is a functional block diagram of the PC, shown in FIG. 1, functioning as the screen editing apparatus.

FIG. 8 is a functional block diagram of the PC 40 functioning as the screen editing apparatus.

The PC 40 executes the client application for achieving a screen editing function to realize functions of a screen configuration storing unit 41, an edited-screen displaying unit 42, an operation receiving unit 43, a show attribute modifying unit 44, a type attribute modifying unit 45, and an other attribute modifying unit 46, shown in FIG. 8.

The screen configuration storing unit 41 is an attribute storing unit that stores therein the screen configuration information, shown in FIG. 6, that is, at least the type attribute of each of the selection components and the show attribute of each of the options belonging to each of the selection components. The screen configuration storing unit 41 also functions to obtain the screen configuration information currently being used by the image processing apparatus 10 from the UI customization control unit 122, and to provide edited screen configuration information to the UI customization control unit 122, making the edited screen configuration information available to be displayed on the image processing apparatus 10.

The edited-screen displaying unit 42 has a function to display the GUI edition screen 200, shown in FIG. 5, on a displaying unit. The preview displaying section 230 is displayed based on the information stored in the screen configuration storing unit 41. When the information in the screen configuration storing unit 41 is changed, the change is reflected onto the screen in real time.

The operation receiving unit 43 functions to receive operations performed by the user, such as a selecting operation of an screen to be edited or a button in the GUI edition screen 200, an instruction to change attribute by way of, for example, the "show" button 251 or the "hide" button 252, and a screen editing operation. The operations can be received with a mouse, a keyboard or the like.

The show attribute modifying unit 44 functions to modify the screen configuration information stored in the screen configuration storing unit 41 accordingly when the operation receiving unit 43 receives an instruction to modify a show attribute. The show attribute modifying unit 44 also functions to notify the change to the type attribute modifying unit 45, and to change the screen configuration information stored in the screen configuration storing unit 41 accordingly when an instruction is given to modify a show attribute from the type attribute modifying unit 45.

Upon being notified from the show attribute modifying unit 44 that a show attribute of an option in the screen configuration information has been changed, the type attribute modifying unit 45 functions to change the value of the type attribute of the selection component having the option (and a higher and a lower selection components belonging thereto) in an appropriate value considering various conditions. It will be described later in detail what value is set under what conditions.

The type attribute modifying unit 45 also functions to change the contents of the screen configuration information stored in the screen configuration storing unit 41 accordingly when the operation receiving unit 43 receives an instruction to modify a type attribute. In this situation, the type attribute modifying unit 45 determines if it is necessary to change the show attribute for the operation component whose type attribute has been changed, or for a higher or a lower setting operation component belonging thereto, depending on how the value of the type attribute has been changed. If it is determined that the change is necessary, the type attribute modifying unit 45 functions to instruct the show attribute modifying unit to change the show attribute. It will be also described later when such an instruction is given.

The other attribute modifying unit 46 functions to give various changes, other than to the show attribute and the type attribute, to the screen configuration information stored in the screen configuration storing unit 41, according to an instruction received by the operation receiving unit 43.

The PC 40 functioning as the screen editing apparatus described above has characteristics in that the display format of a selection component can be specified using a show attribute; and that, if the show attribute of an option is changed through the GUI edition screen 200, the type attribute of the selection component including the option is automatically changed appropriately, considering the value of the changed show attribute of each of the options.

It will be now explained processes executed by the screen editing apparatus to provide the settings, and a specific example of the value of the show attribute change performed by the process.

If the CPU in the PC 40 functioning as a screen editing apparatus detects that a show attribute corresponding to an option has been changed in the GUI edition screen 200 or an instruction thereof has been given while executing the client application, the PC 40 executes a process for setting the type attribute. As described above, the instruction for changing the show attribute is received by the show/hide displaying section 250 for a button corresponding to the option. Either one of a type attribute setting process or a show attribute modifying process, each of which is to be described blow, may be executed first. However, the type attribute setting process makes a reference to a value of a show attribute changed based on the received instruction. Therefore, to simplify the explanation, the type attribute setting process herein is executed after the show attribute is changed.

Figure 9:
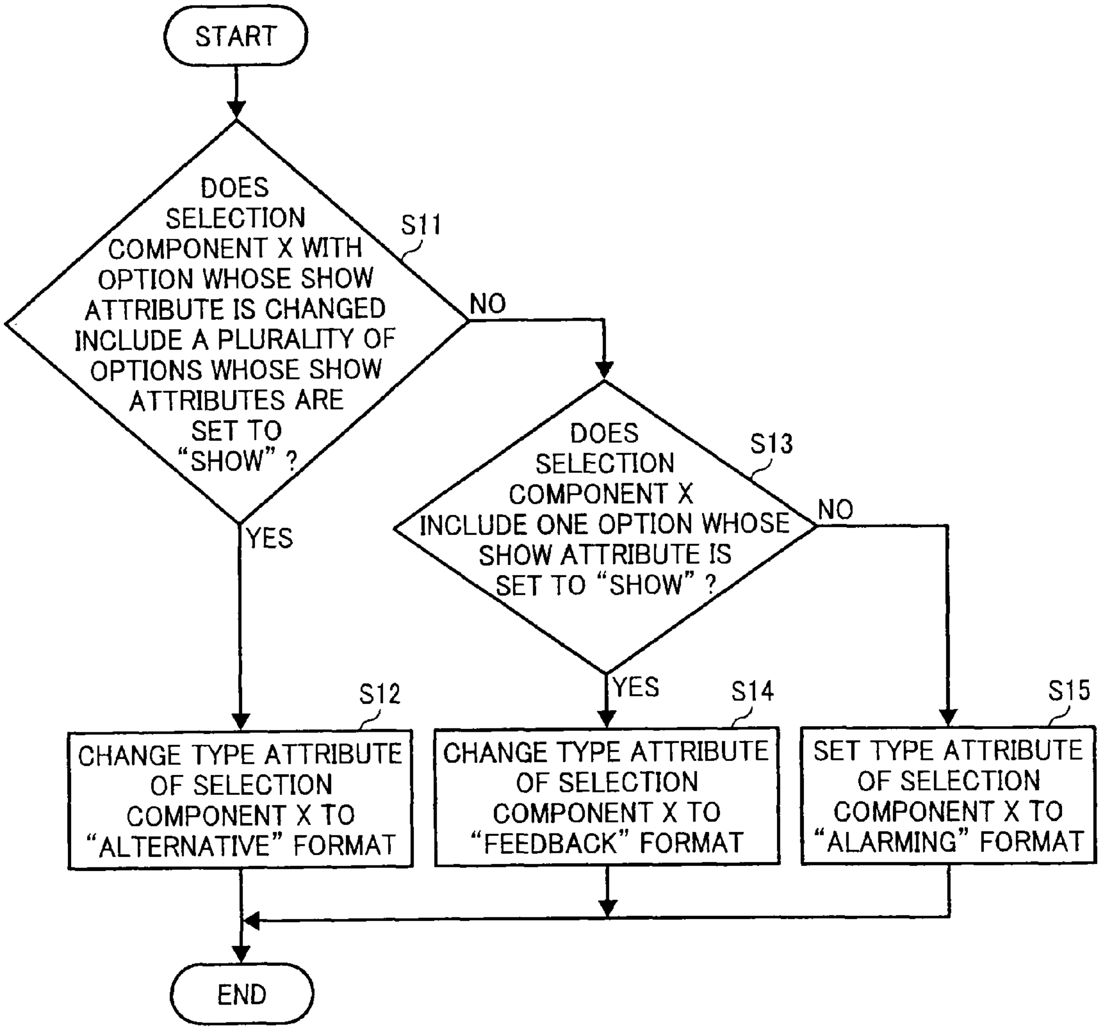
FIG. 9 is a first flowchart of a type attribute setting process performed by a CPU in the screen editing apparatus.

FIG. 9 is a flowchart of the type attribute setting process according to a first example.

In the process shown in FIG. 9, the CPU in the PC 40 determines if the selection component having the option whose show attribute has been changed (hereinafter, "selection component X") includes a plurality of options whose show attributes are set to "show" at a step S11. If YES at the step S11, the system control proceeds to a step S12 to change the type attribute of the selection component X to the "alternative" format, and the process is ended. Because one will be selected from a plurality of options, it is considered appropriate to use the alternative format for the selection component.

If "NO" applies at the step S11, the system control proceeds to a step S13 to determine if the selection component X only include a single option whose show attribute is set to "show". If "YES" at the step S13, the system control proceeds to a step S14 to change the type attribute of the selection component X to the "feedback" format, and the process is ended. In this situation, for the function corresponding to the selection component X, the option whose show attribute is set to "show" is always selected. This means that it is not necessary to receive a selecting operation, and therefore, it is considered preferable to use the feedback format to display the set content of the item associated with the selection component X. Moreover, if the feedback format is used, no user operation can be received. This realizes a GUI that does not show meaningless operating component to confuse the user.

If "NO" applies at the step S13, the system control sets the type attribute of the selection component X to the "alarming" format, and the process is ended. In this situation, some options need to be displayed for the function corresponding to the selection component X. However, no button is displayed in association with any options. Because no options can be displayed, it is considered that no selecting operation can be performed. Thus, it is considered that the user should be notified.

In the process explained above, the CPU in the PC 40 functions as the type attribute modifying unit 45. When a value of a show attribute of any option has been changed, the process enables the selection component having that option to be given with an appropriate type automatically, based on the number of options, included in the selection component whose show attribute is set to "show"; that is, based on the number of the options whose corresponding buttons are displayed on the GUI. In the process shown in FIG. 9, it is not necessary to consider if the selection component X has the function OFF as its option. When the process shown in FIG.

9 is to be used, if the show attribute of the function OFF option is set to "hide", it means that the selection of the function OFF is prohibited.

FIGS. 10A to 10D are specific examples of how the type attributes are set (changed) based on the type attribute setting process shown in FIG. 9. In FIGS. 10A to 10D, the configurations of a selection component are provided, and GUI representations thereof are shown below the configuration.

In the examples shown in FIGS. 10A to 10D, the selection component X includes three options A to C, and the show attribute of each of the options A to C is changed from "show" to "hide", one by one. The attributes changed by the user are shown in a dotted pattern, and the attribute set (changed) automatically depending thereon are shown in a hatched pattern.

Figure 10A:
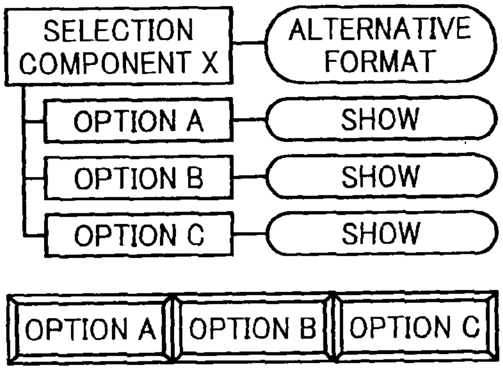
FIGS. 10A to 10D are diagrams of specific examples of how the type attributes are set based on the type attribute setting process shown in FIG. 9.

As shown in FIG. 10A, if all of the three options are set to "show", it means that there are a plurality of options whose show attributes are set to "show". Thus, the type attribute of the selection component X is set to the "alternative" format. On the GUI, buttons are displayed for each of the options.

Figure 10B:
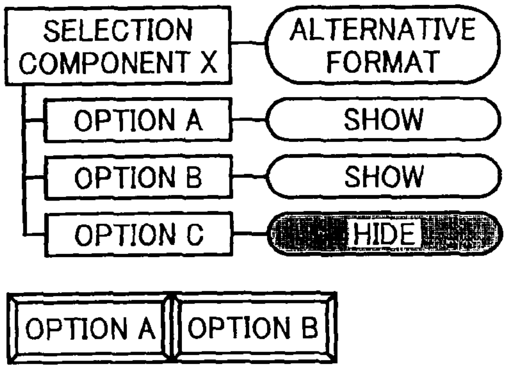

If the user changes the show attribute of one of the options (option C) to "hide", as shown in FIG. 10B, there are still a plurality of options whose show attributes are set to "show". Therefore, the type attribute of the selection component X is still kept to the "alternative" format. On the GUI, the buttons corresponding to those options whose show attributes are set to "show" are displayed.

Figure 10C:
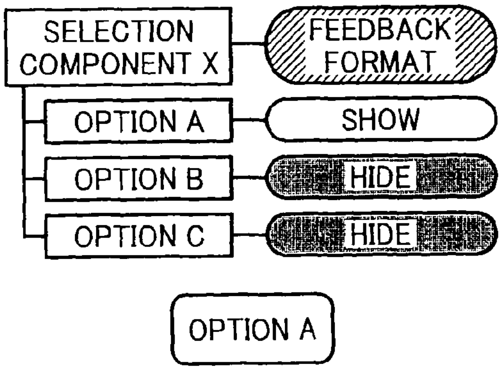

If the user further changes the show attribute of the option B to "hide", as shown in FIG. 10C, there remains only one option whose show attribute is set to "show". Therefore, according to the step S14 shown in FIG. 9, the type attribute of the selection component X is changed to the "feedback" format. In this setting, the image processing apparatus 10 will automatically select the option A whose show attribute is set to "show", and the GUI is presented accordingly.

Figure 10D:
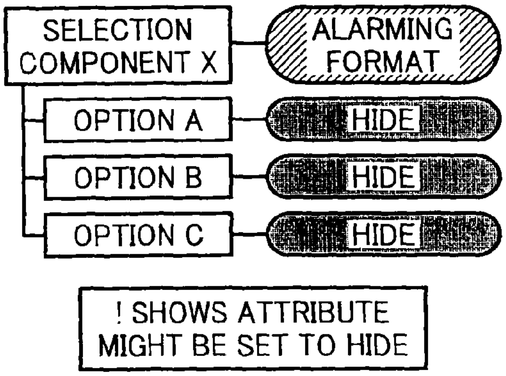

If the user further changes the show attribute of the option A to "hide", as shown in FIG. 10D, there is no more option whose show attribute is set to "show". Therefore, according to the step S15 shown in FIG. 9, the type attribute of the selection component X is changed to the "alarming" format. In this setting, the alarming message, as one shown in FIG. 7, is displayed for the selection component X.

The CPU in the PC 40 may also execute a following type attribute setting process instead of the one in the first example described above.

Figure 11:
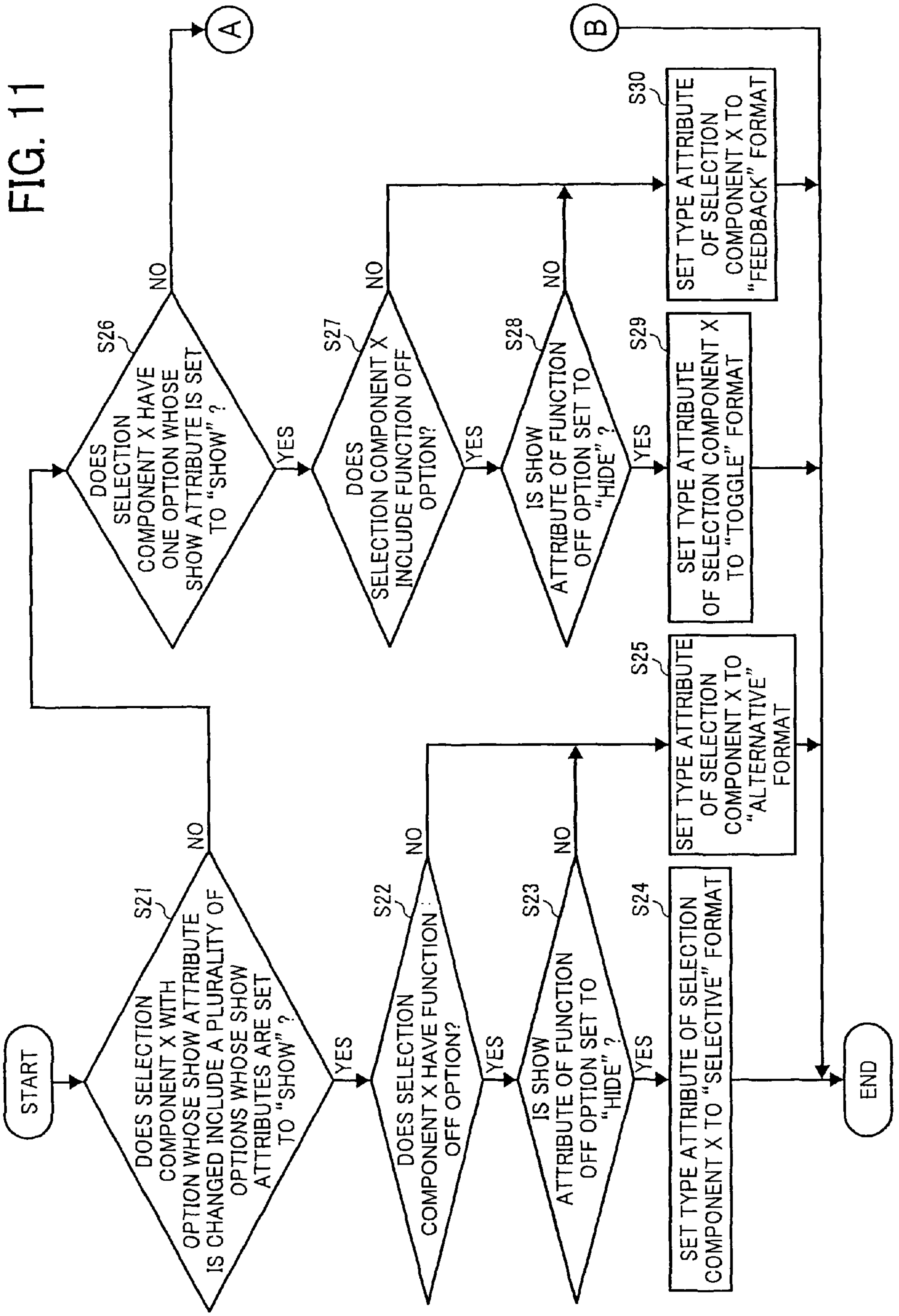
FIG. 11 is a second flowchart of the type attribute setting process.
Figure 12:
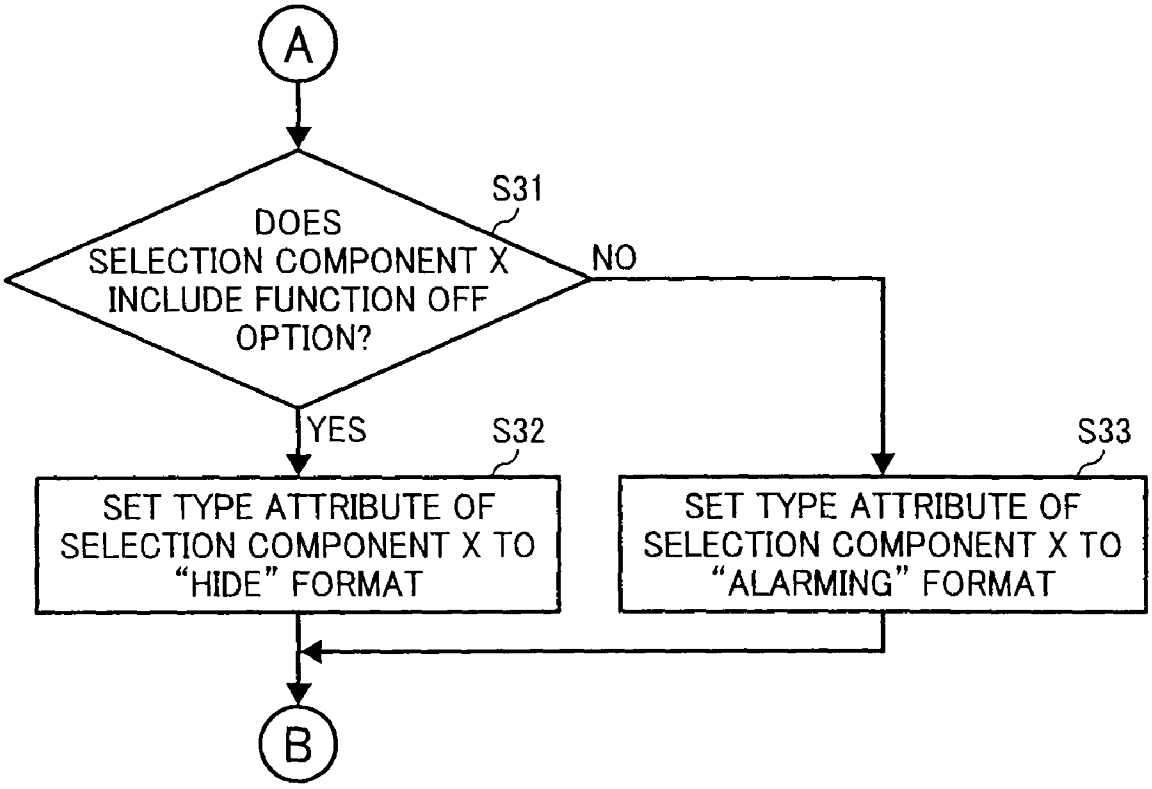
FIG. 12 is a flowchart continuing from the flowchart shown in FIG. 11.

FIGS. 11 and 12 are flowcharts of the type attribute setting process according to a second example.

In the process shown in FIG. 11, the CPU in the PC 40 determines if the selection component having the option whose show attribute has been changed (hereinafter, "selection component X") includes a plurality of options whose show attributes are set to "show" at a step S21.

If YES at the step S21, the system control proceeds to a step S22 to further determine if the selection component X has the function OFF option, which is used to disable the function, as one of its options. If YES at the step S22, the system control moves to a step S23, and further determines if the show attribute of the function OFF is set to "hide".

If the show attribute is determined to be set to "hide" at the step S23, the type attribute of the selection component X is set to the "selective" format, and the process is ended.

In this setting, the selection component X assumingly includes a plurality of options whose show attributes are set to "show", in addition to the function OFF. Moreover, in the process of FIG. 11, if the show attribute of the function OFF is set to "hide", it is interpreted that the user's intention is to reduce the number of buttons to be displayed on the GUI, rather than to eliminate the function OFF option itself. Therefore, in this setting, it can be concluded that it is preferable to provide the selection component X with a format that displays the buttons corresponding to the options, and to permit no options to be selected, to allow the function OFF option to be selected.

If "NO" applies at the step S22 or S23, the system control proceeds to a step S25 to set the type attribute of the selection component X to the "alternative" format, and the process is ended. In this setting, the selection component X should always receive one of the options, thus it is assumed to be preferable to use the "alternative" format for the selection component X. The options belonging to the selection component X might also include a function OFF as one of its options.

If "NO" applies at the step S21, the system control proceeds to a step S26 to determine if the selection component X has one option whose show attribute is set to "show". If YES at the step S26, the system control proceeds to a step S27 to determine if the selection component X includes the function OFF as one of its options. If YES at the step S27, the system control proceeds to a step S28 to determine if the show attribute of the function OFF is set to "hide".

If the show attribute of the function OFF is determined to be set to "hide" at the step S28, the type attribute of the selection component X is set to "toggle" format, and the process is ended. In this setting, because the selection component X has the function OFF option and another single selectable option, it is assumed that the user's intention is not to display a button for the function OFF option. Therefore, it can be concluded that it is preferable to provide the selection component X with the toggle format, so that the single option and the function OFF can be selected by a toggle.

If "NO" applies at the step S27 or S28, the system control proceeds to a step S30 to set the type attribute of the selection component X to the "feedback" format, and the process is ended. In this setting, the option whose show attribute is set to "show" will be always selected for the selection component X. This means that there is no need to receive a selecting operation. Therefore, it is assumed preferable to use the feedback format to simply display the content of the selected option. The selected option can possibly be the function OFF.

If "NO" applies at the step S26, the system control proceeds to a step S31, shown in FIG. 12, to determine if the selection component X includes the function OFF option.

If YES at the step S31, the system control proceeds to a step S32 to set the type attribute of the selection component X to the "hide" format, and the process is ended. (On this flowchart and hereinafter, the process goes back to FIG. 11 and is ended.) In this setting, the selection component X does not have any option for which a button is to be displayed on the screen. However, it is interpreted that the user does not intend to eliminate the function OFF option itself, even if the show attribute thereof is set to "hide". Therefore, in this setting, it is preferable to display nothing on the GUI, and to cause the image processing apparatus 10 to operate with the selection component X always being set to the function OFF.

Because the show attributes of all of the options are set to "hide", other formats can be also used just to display nothing on the GUI. However, when the "hide" format is set to the selection component X, it can be determined that nothing needs to be displayed for the selection component X without referring to each of the options, advantageously simplifying the display process performed by the image processing apparatus 10.

If the selection component X is determined not to include the function OFF option at the step 31, the system control proceeds to a step S33 to set the type attribute of the selection component X to the "alarming" format, and the process is ended. In this setting, one of the options needs to be selected for the function corresponding to the selection component X; however, there is no button corresponding to any one of the options. Thus, no selection can be made or no content can be displayed. Therefore, it is considered preferable to give an alarm to the user.

In the process explained above, the CPU in the PC 40 also functions as the type attribute modifying unit 45. Based on this process, when the show attribute of one of the options is changed, the type attribute of the selection component having the option can be automatically changed to an appropriate value, based on the number of options provided thereto whose show attribute is set to "show", as well as whether the selection component includes the function OFF option whose show attribute is set to "hide".

FIGS. 13A to 13F are specific examples of how the type attributes are set (changed) based on the type attribute setting process shown in FIGS. 11 and 12. In FIGS. 13A to 13F, configuration information of a selection component is provided, and GUI representations thereof are shown below the configuration.

In the examples shown in FIGS. 13A to 13F, the selection component X includes three options A, B, and function OFF. The attributes changed by the user are shown in a dotted pattern, and the attribute set (changed) automatically depending thereon are shown in a hatched pattern.

Figure 13A:
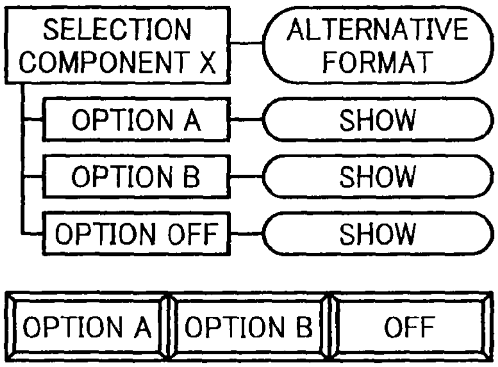
FIGS. 13A to 13F are diagrams of specific examples of how the type attributes are set based on the type attribute setting process shown in FIGS. 11 and 12.

As shown in FIG. 13A, if all of the three options are set to "show", it means that there are a plurality of options whose show attributes are set to "show", and there is no function OFF option whose show attribute is set to "hide". Thus, the type attribute of the selection component X is set to the "alternative" format. On the GUI, corresponding buttons are displayed for each of the three options.

Figure 13B:
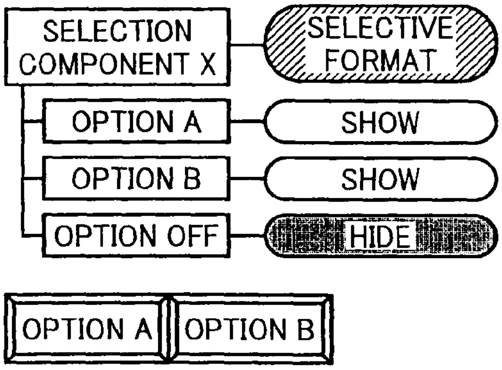

If the user changes the show attribute of the function OFF option to "hide", as shown in FIG. 13B, there are still a plurality of options whose show attributes are set to "show" and a function OFF option whose show attribute is set to "hide". Therefore, the type attribute of the selection component X is changed to the "selective" format according to the step S24 shown in FIG. 11. On the GUI, the buttons corresponding to the options A and B are displayed, while permitting none of the options A and B to be selected.

Figure 13C:
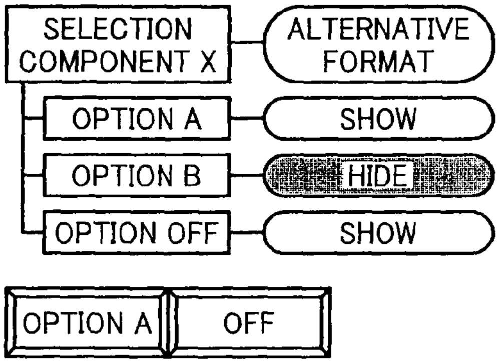

From the setting shown in FIG. 10A, if the user changes the show attribute of one of the options other than the function OFF as shown FIG. 13C (the option B), there are still a plurality of options whose show attributes are set to "show", and there is also still no function OFF option whose show attribute is set to "hide". Thus, the type attribute of the selection component X is kept in the "alternative" format. On the GUI, the buttons are displayed for the option A and the function OFF, whose show attributes are set to "show".

Figure 13D:
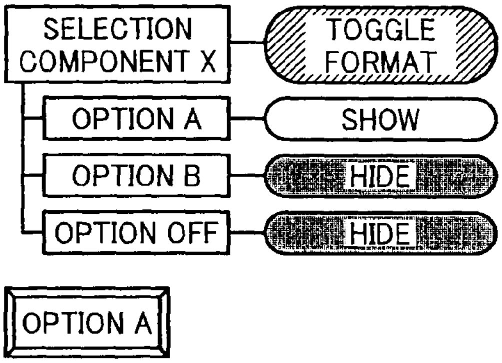

If the user changes the show attribute of one of the options A or B (B in FIG. 13B) to "hide" from the setting shown in FIG. 13B, or that of the function OFF option to "hide" from the setting shown in FIG. 13C, there is now only one option whose show attribute is set to "show", as shown in FIG. 13D, and there is a function OFF option whose show attribute is set to "hide". Thus, the type attribute of the selection component X is changed to the "toggle" format according to the step S29 shown in FIG. 11. On the GUI, a button is displayed for the option A whose show attribute is set to "show". It is also permitted for the option A to be not selected.

Figure 13E:
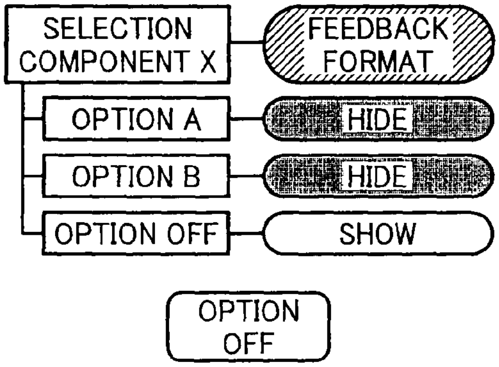

If the user changes the show attribute of the option A to "hide" from the setting shown in FIG. 13C, as shown in FIG. 13E, while the function OFF is the only option whose show attribute is set to "show", there is only one option whose show attribute is set to "show", and there is no function OFF option whose show attribute is set to "hide". Thus, the type attribute of the selection component X is changed to the "feedback" format according to the step S30 shown in FIG. 11. In this setting, the image processing apparatus 10 will automatically select the function OFF whose show attribute is set to "show", and makes a display accordingly.

Figure 13F:
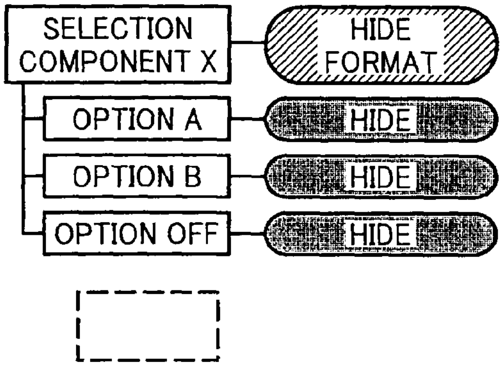

If the user changes the show attribute of the remaining option to "hide" from the setting shown in FIG. 13D or 13E, there is no longer any option whose show attribute is set to "show", and there is a function OFF option whose show attribute is set to "hide", as shown in FIG. 13F. Thus, the type attribute of the selection component X is changed to the "hide" format. In this setting, no button is displayed for the selection component X.

The transition of the type attribute shown in FIG. 10A to 10D may be also achieved according to the process shown in FIGS. 11 and 12, in the same manner according to the process shown in FIG. 9.

The CPU in the PC 40 may also execute a following type attribute setting process instead of those in the first and the second examples described above.

Figure 14:
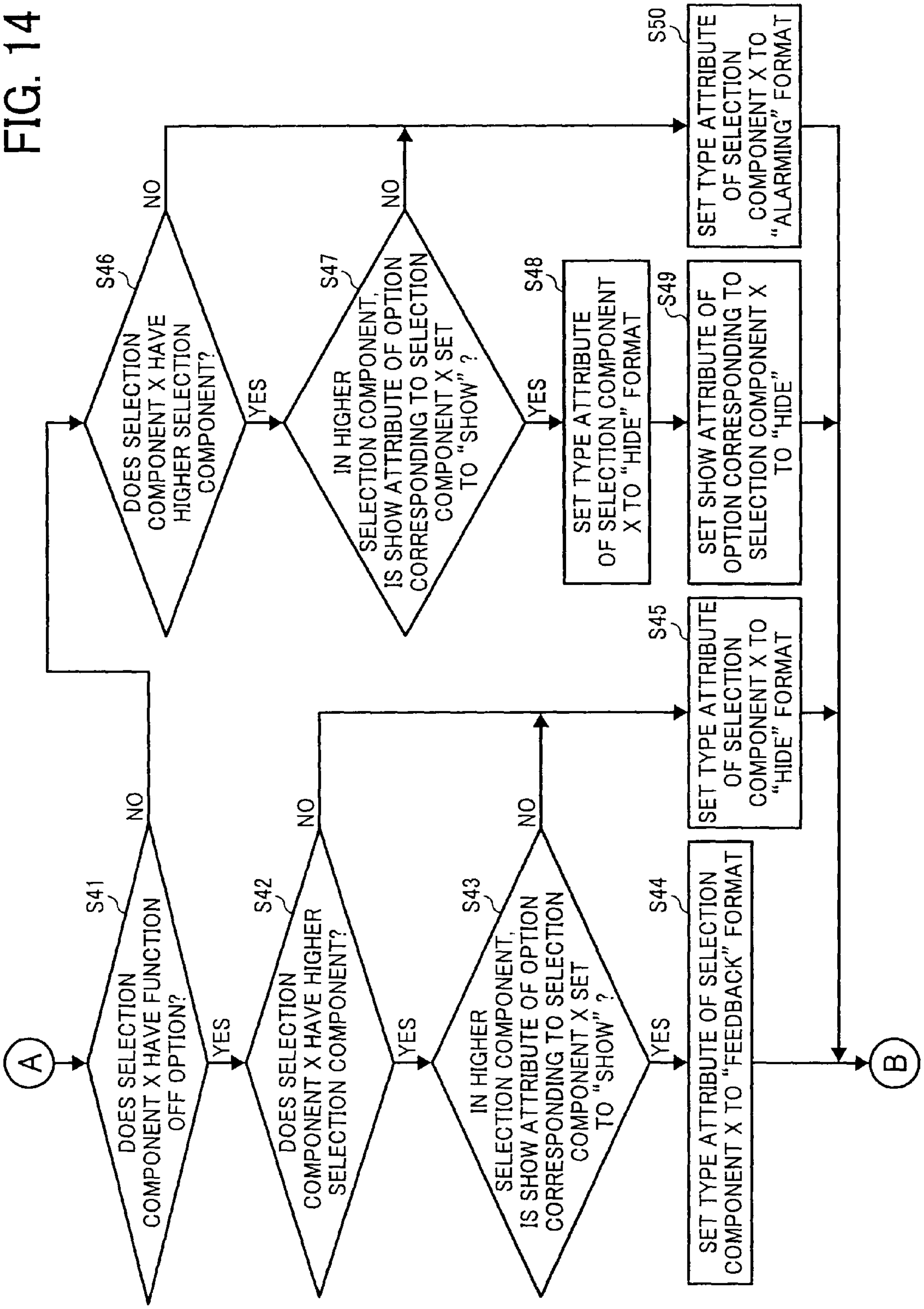
FIG. 14 is a third flowchart of the type attribute setting process.

FIG. 14 is a flowchart of the type attribute setting process according to a part of a third example.

This process according to the third example is basically the same as that according to the second example, except that the flowchart shown in FIG. 14 is executed instead of the process shown in FIG. 12, if "NO" applies at the step S26 shown in FIG. 11. Therefore, the process shown in FIG. 14 is focused on describing the type attribute setting process according to the third example.

In the type attribute setting process according to the third example, if "NO" applies at the step S26 in FIG. 11, that is, if the selection component whose show attribute is changed (the selection component X) has no option whose show attribute is set to "show", the CPU in the PC 40 proceeds to a step S41 shown in FIG. 14 to determine if the selection component X has a function OFF option.

If YES at the step S41, the system control proceeds to a step S42 to further determine if the selection component X has a higher selection component. The relationship with a higher/lower selection component is created when a selection component is arranged in a hierarchy, as explained above with reference to FIG. 6.

If "YES" applies at the step S42, the system control proceeds to a step S43 to determine if, out of the options included in the higher selection component, one that the selection component X belongs has a show attribute set to "show". If YES at the step S43, the system control proceeds to a step S44 to change the type attribute of the selection component X to the "feedback" format, and the process is ended.

In the third example, it is also assumed that, even if the function OFF option is set to "hide", the intention of the user was not to eliminate the option itself, in the same manner as in the second example. If all of the options provided to the selection component are set to "hide" and a function OFF is included, the image processing apparatus 10 is caused to operate with the function OFF always being selected. However, it would be a problem if the option of the higher selection component corresponding to the selection component X has a show attribute set to "show", assuming that the selection component X is not displayed at all, the relationship between that option provided to the higher selection component and the selection component X associated therewith cannot be recognized on the GUI. Therefore, if "YES" applies at the step S43, the "feedback" format is selected so that the option provided to the higher selection component can be automatically associated with the selection component X on the GUI. In this manner, the user can recognize the relationship thereof easily.

If "NO" applies at the step S42 or S43, the system control proceeds to a step S45 to set the type attribute of the selection component X to the "hide" format, and the process is ended. In this setting, because it is not necessary to consider the relationship with the higher hierarchy, it is preferable to provide the selection component X with the "hide" format in the same manner as in the step S32 shown in FIG. 12.

If "NO" applies at the step S41, the system control proceeds to a step S46 to determine if the selection component X has a higher selection component and if the show attribute of the option, corresponding to the selection component X, of the higher selecting operation is set to "show", in the same manner as at the steps S42 and S43. If "YES" applies at the both steps, the system control proceeds to a step S48 to set the type attribute of the selection component X to the "hide" format and set the show attribute of the option corresponding to the selection component X to "hide" at a step S49, and the process is ended.

In this setting, although one of the options needs to be selected for the function represented by the selection component X, nothing can be selected or no options can be displayed. However, in this setting, because the user sets the show attributes of all of the options to "hide", it is often intended not to use the function represented by the selection component X. In other words, in the higher hierarchy, no options requiring setting of the selection component X (the option corresponding to the selection component X) will not be selected. By performing the steps S48 and S49, the user's intention can be reflected automatically to the GUI. Moreover, if the show attributes of the options are set to "hide" at the higher hierarchy, no options will need to be selected for the function represented by the selection component X. Therefore, even if the selection component X is set to "hide", it will be no problem for the operations of the image processing apparatus 10.

If "NO" applies at the step S46 or S47, the system control proceeds to a step S50 to set the type attribute of the selection component X to the "alarming" format, and the process is ended. In this setting, because it is not necessary to consider the relationship with the higher hierarchy, it is preferable to provide the selection component X with the "alarming" format in the same manner as at the step S33 shown in FIG. 12.

In the process explained above, the CPU in the PC 40 functions also as the type attribute modifying unit 45. When the show attribute of an option has been changed, this process enables the selection component having that option to be specified with an appropriate type automatically, based on the number of options that belong to the selection component and whose show attributes are set to "show"; whether the selection component has a function OFF option whose show attribute set to "hide"; and whether the selection component has a higher selection component.

Figure 15:
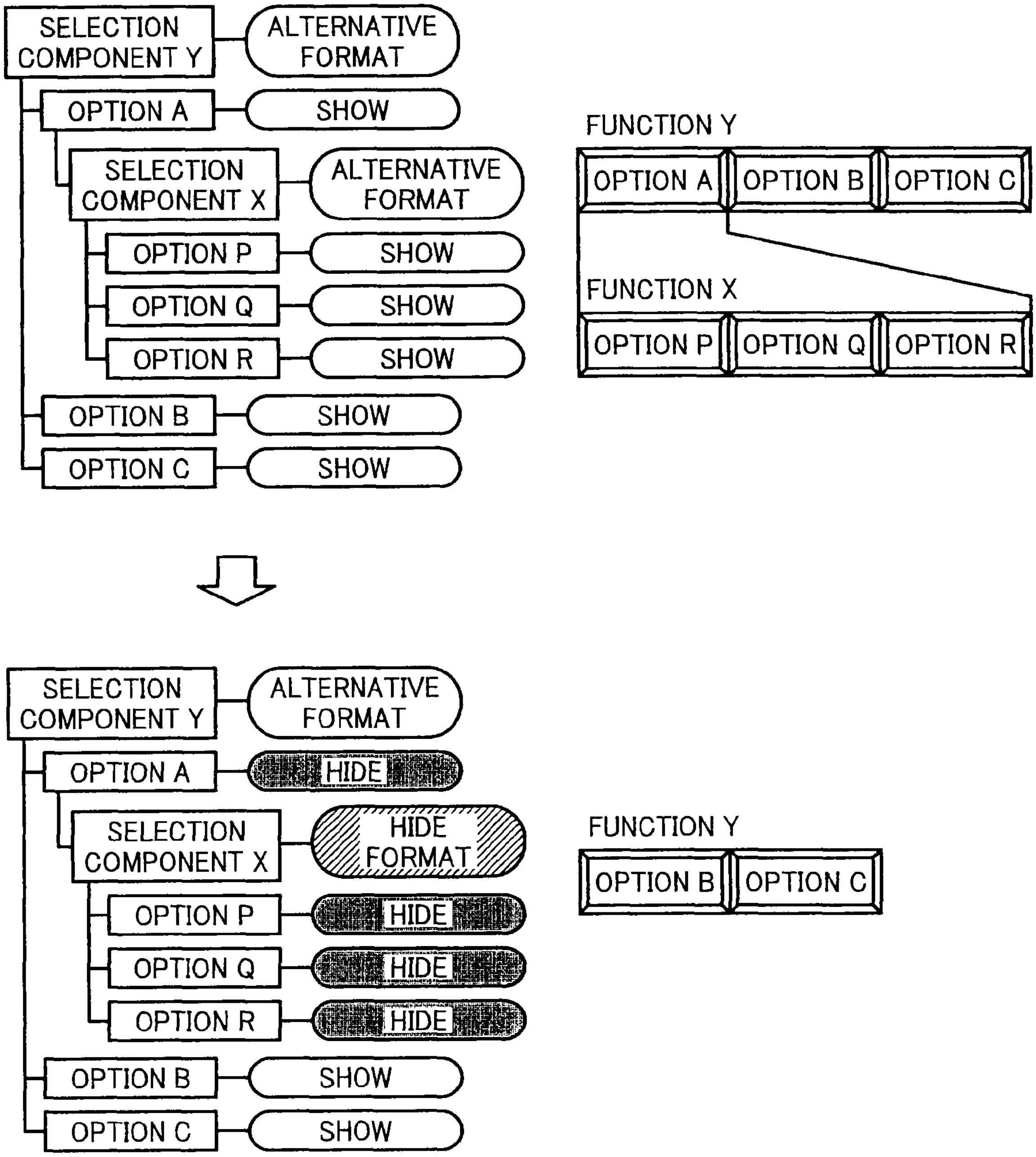
FIG. 15 is a diagram of specific examples of how the type attributes are set based on the type attribute setting process shown in FIG. 14.
Figure 16:
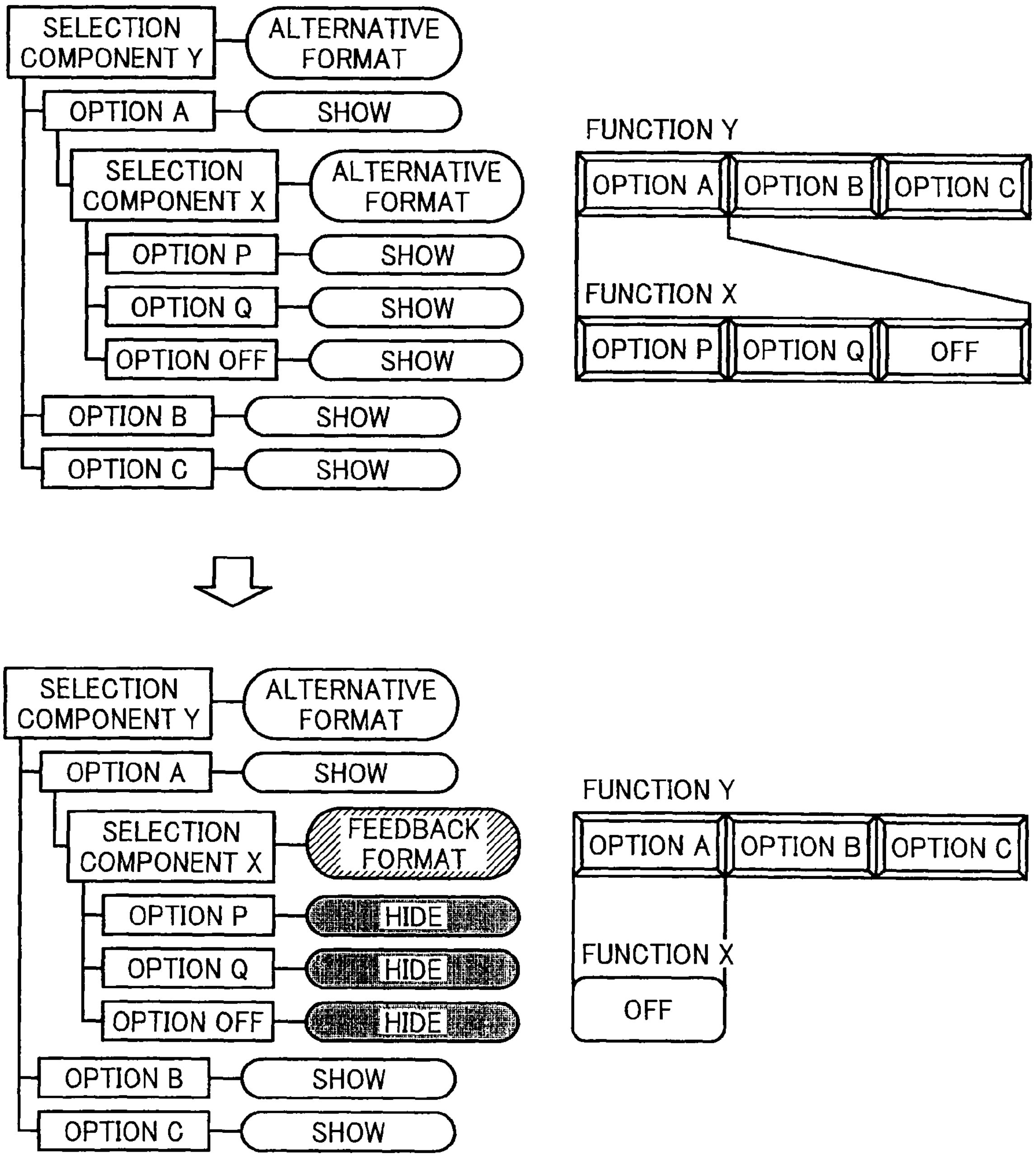
FIG. 16 is a diagram of another specific example thereof.

FIGS. 15 and 16 are specific examples of how the type attributes are set (changed) based on the type attribute setting process shown in FIG. 14. In FIGS. 15 to 16, configuration information of a selection component is provided, and GUI representations thereof are shown below the configuration.

In the examples shown in FIG. 15, a selection component Y has three options A to C, and the lower selection component X corresponding to the option A also has three options P to R. The attributes changed by the user are shown in a dotted pattern, and the attribute set (changed) automatically according thereto are shown in a hatched pattern.

In the beginning, because both of the selection components X and Y are set to the alternative format, buttons are displayed, respectively to enable selections of the options A to C, on the GUI for a function Y represented by the selection component Y. To receive detailed setting, when the option A is selected, buttons are displayed, respectively provided for selecting the options P to R, on the GUI for a function X represented by the selection component X.

If the show attribute of all of the three options are set to "hide" for the selection component X, the type attribute of the selection component X is set to "hide" format according to the steps S48 and S49 shown in FIG. 14. At the same time, the show attribute of the option A that the selection component X belongs is also set to "hide".

As a result, for the function Y, only these buttons for selecting the options B and C are displayed on the GUI. No buttons are displayed for providing settings for the function X; however, the selection A that will require usage of the function X is not selectable. Therefore, any function not displayed on the GUI will not be used.

The examples shown in FIG. 16 are generally the same as those shown in FIG. 15, except that the selection component X is shown to have a button for the function X to select the function OFF option, instead of a button for selecting the option R.

If the show attribute of all of the three options are set to "hide" for the selection component X, the type attribute of the selection component X is set to "feedback" format according to the step S44 shown in FIG. 14. As a result, the button representing the function Y is still displayed on the GUI to simply display the current set contents for the function Y. In this setting, the selection component X does not have any option whose show attribute is set to "show"; however, the image processing apparatus 10 always automatically selects the function OFF when operating with this screen configuration information.

Figure 17:
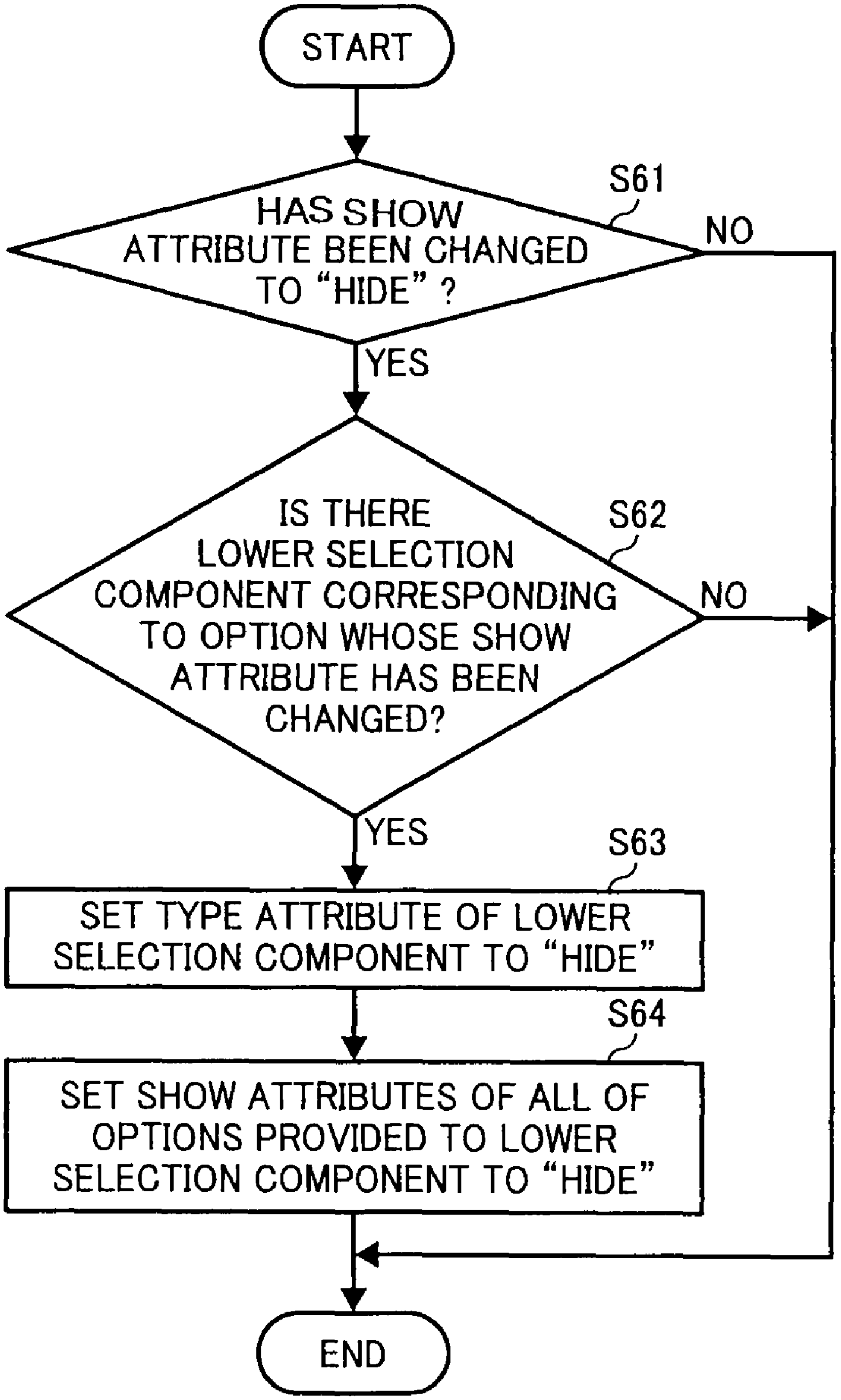
FIG. 17 is a flowchart of an additional process executed by the CPU of the screen editing apparatus with the third type attribute setting process.

When the process shown in FIG. 14 is to be adopted, the CPU in the PC 40 should additionally perform a process shown in FIG. 17.

In the process shown in FIG. 17, the CPU in the PC 40 determines if the changed show attribute is set to "hide" at a step S61. If YES at the step S61, the system control proceeds to a step S62 to determine if the option whose show attribute has been changed has a corresponding lower selection component.

If YES at the step S62, the type attribute of the lower selection component is set to "hide" at a step S63, and the show attributes of all of the options provided to the selection component are set to "hide" at a step S64, and the process is ended.

If "NO" applies at the step S61 or S62, the process is ended at the respective steps.

If an option is set to "hide" in the higher selection component, the function represented thereby is not used. Therefore, there is no need to receive settings at the lower selection component. Thus, if the lower selection component is displayed on the GUI, the space would be wasted. By automatically setting the lower selection component to be hidden in association with the "hide" setting of the setting item, the screen editing operation can be advantageously simplified.

Figure 18:
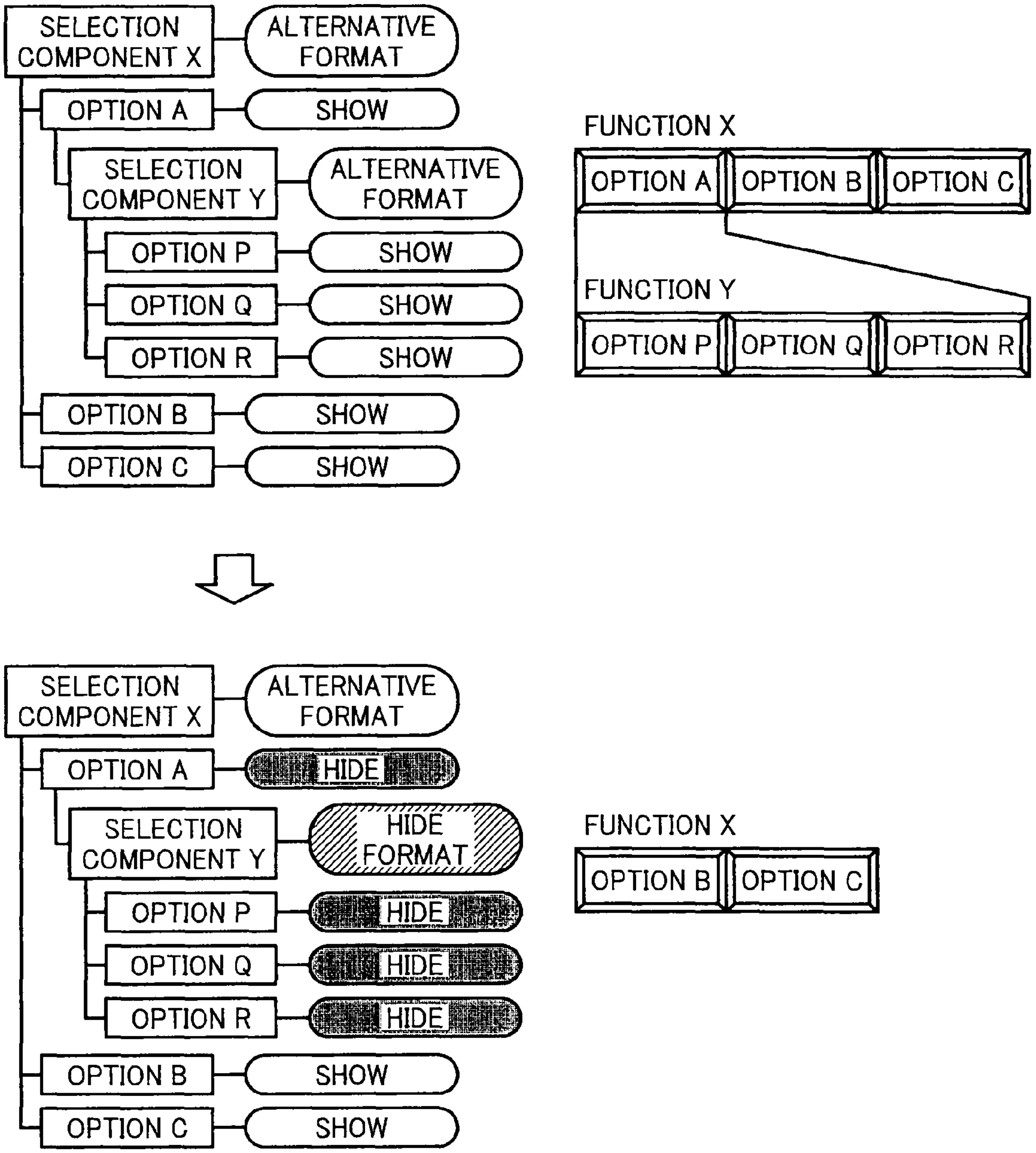
FIG. 18 is a diagram of specific examples of how the attributes are set based on the process shown in FIG. 17.

FIG. 18 depicts specific examples of how the attributes are set based on the above-described process.

In the beginning, the configurations are same as those shown in FIG. 15. If the show attribute of the option A is changed to "hide", the type attribute of the lower selection component X associated therewith is changed to the "hide" format, and the show attributes of all of the options belonging thereto are set to "hide". As a result, only the buttons for selecting the options B and C for the function Y are respectively displayed on the GUI.

The embodiments of the present invention are as described above. It should be needless to say that the configuration of the apparatus, the specific processes, the displayed screen contents or application thereof, the data formats and alike are not limited to those specifically described in the embodiments.

For example, other values may be set as the type attribute in addition to those described for the embodiments. Depending on the user needs, it is also possible to modify the specific value set to the type attribute as appropriate when the value of the show attribute is changed, based on the number of options, whose show attribute is set to "show", belonging to the selection component; whether the selection component has a function OFF option whose show attribute set to "hide"; and whether the selection component has a higher selection component.

If the second or third examples of the type attribute setting process are to be adopted, the function OFF option can be always selected from the GUI, even if the button corresponding thereto is not displayed on the GUI. Therefore, by setting the show attribute of the function OFF to "hide", the number of buttons displayed on the GUI can be reduced without limiting the number of options. If the show attribute of the function OFF option is set to be "hide" by the user selection or automatically by default, it is possible to achieve a GUI that can be operated with a reduced number of buttons, without cumbersome editing operations such as setting the show attributes to "hide" one by one. In contrast to the above, if the options other than function OFF are set to "hide", the option ends up not being selectable. Therefore, it is preferable for these options to be set to "show" by default.

It should be needless to say that the present invention may be applied to any screen editing apparatus for editing a GUI used for apparatus other than the image processing apparatus. For example, the present invention can be used as an apparatus for editing operation screens to be displayed on a displaying unit provided to an electrical apparatus, such as a networked home appliance, a vending machine, a medical appliance, an air-conditioning system, a measuring system for gas, water, or electricity, an automobile, an air plane, or a general-purpose computer The operation components displayed on the screen is also not limited to the buttons.

The recording medium according to embodiments of the present invention stores therein a computer program for causing a computer to control hardware to operate as the screen editing apparatus described above. It is possible to achieve the same effects as those described in the embodiments and the variations, by reading the computer program from the recording medium and causing the CPU to execute the program. This computer program may also be downloaded, instead of being distributed in the recording medium.

The configurations and variations described above can be combined anyway as long as the combination is not contradictory.

As described above, according to an aspect of the present invention, when a user edits a screen to be displayed on the displaying unit and arranges selection components having a plurality of options that can be set either to be shown or hidden, a screen with a natural look can be achieved with simple operations.

Furthermore, according to another aspect of the present invention, it is possible to cause a computer to operate as the screen editing apparatus so that the same advantage can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An apparatus for editing an operation screen to be displayed on a display unit, the apparatus comprising:

an attribute storing unit that stores therein a type attribute indicating a type of a selection component for defining how the selection component having a plurality of options is to be displayed on the operation screen and a display attribute indicating a show/hide status of an operation component representing each of the options;

a display attribute modifying unit that modifies a value of the display attribute stored in the attribute storing unit according to an operation from a user; and a type attribute modifying unit that modifies, when a value of the display attribute of any of the options is changed, the type attribute of the selection component having the options to an appropriate value depending on a number of the options whose display attributes are set to the show status.

2. The apparatus according to claim 1, wherein the attribute storing unit further stores therein information for identifying a function OFF option, and the type attribute modifying unit modifies the type attribute of the selection component to a value considering whether the selection component includes the function OFF option whose display attribute is set to the hide status.

3. The apparatus according to claim 2, wherein the type attribute is settable to a selective format that displays the selection component having the options whose display attributes are set to show on the operation screen, and allows one component to be selected simultaneously, and the type attribute modifying unit modifies the type attribute of the selection component to the selective format when a value of the display attribute is changed for any of the options of the selection component, and when the selection component includes the function OFF option whose display attribute is set to the hide status and the selection component includes two or more options whose display attributes are set to the show status.

4. The apparatus according to claim 2, wherein the type attribute is settable to a toggle format that displays only one operation component on the operation screen to receive selection or non-selection of an option by way of a toggle, and the type attribute modifying unit modifies the type attribute of the selection component to the toggle format when a value of the display attribute is changed for any of the options of the selection component, and if the selection component includes the function OFF option whose display attribute is set to the hide status and the selection component includes only one option whose display attribute is set to the show status.

5. The apparatus according to claim 2, wherein the type attribute is settable to the hide status that does not display anything for the selection component, and the type attribute modifying unit modifies the type attribute of the selection component to the hide status when a value of the display attribute is changed for any of the options of the selection component, and if the selection component includes the function OFF option whose display attribute is set to the hide status and the selection component does not have any option whose display attribute is set to the show status.

6. The apparatus according to claim 2, further comprising:

a unit that sets the display attribute of the function OFF option to the hide status by default.

7. The apparatus according to claim 1, wherein the type attribute is settable to a feedback format that displays a content set to a setting item corresponding to the selection component on the operation screen, and the type attribute modifying unit modifies the type attribute of the selection component to the feedback format when a value of the display attribute is changed in any of the options of the selection component and if the selection component includes a single option whose display attribute is set to the show status.

8. The apparatus according to claim 1, wherein the type attribute is settable to an alarming format that displays an alarm on the operation screen, and the type attribute modifying unit modifies the type attribute of the selection component to the alarming format when a value of the display attribute is changed for any of the options of the selection component and if the selection component does not include any option whose display attribute is set to the show status.

9. The apparatus according to claim 1, wherein a lower selection component is provided in association with the options of the selection component so that the selection components are hierarchically displayed on the operation screen, the attribute storing unit further stores therein, when the lower selection component is provided, a type attribute of the lower selection component and a display attribute of each of the options of the lower selection component, and the type attribute modifying unit modifies the type attribute of the selection component having the options an appropriate value when a value of the display attribute of any of the options is changed, based on whether the selection component has a higher selection component.

10. The apparatus according to claim 9, wherein the type attribute is settable to the hide status that does not display anything in relation to the selection component, the type attribute modifying unit modifies the type attribute of the selection component to the hide status when a value of the display attribute is changed for any of the options of the selection component, and if: a) the selection component does not have any option whose display attribute is set to the show status; and b) the selection component has a higher selection component, and a unit is provided so as to set the display attribute of the option corresponding to the selection component whose type attribute has been changed to the hide status, when the type attribute modifying unit makes modification to the hide format.

11. The apparatus according to claim 9, wherein the type attribute is settable to a feedback format that displays a content set to a setting item corresponding to the selection component on the operation screen, and the type attribute modifying unit modifies the type attribute of the selection component to the feedback format when a value of the display attribute is changed for any of the options of the selection component, and if the selection component includes the function OFF option whose display attribute is set to the hide status, the selection component does not have any option whose display attribute is set to the show status, and the selection component has a higher selection component.

12. The apparatus according to claim 9, wherein the type attribute is settable to the hide status that does not display anything in relation to the selection component, and a unit is provided so that, when the display attribute of the option with the corresponding lower selection component is set to the hide status, the type attribute of the lower selection component corresponding to the option is set to the hide status, and the display attribute of each of the options provided to the lower selection component is also set to the hide status.

13. A method of editing an operation screen to be displayed on a display unit, the method comprising:

storing a type attribute indicating a type of a selection component for defining how the selection component having a plurality of options is to be displayed on the operation screen and a display attribute indicating a show/hide status of an operation component representing each of the options;

display attribute modifying including modifying a value of the display attribute according to an operation from a user; and type attribute modifying including modifying, when a value of the display attribute of any of the options is changed, the type attribute of the selection component having the option to an appropriate value depending on number of the options whose display attributes are set to the show status.

14. The method according to claim 13, wherein the storing includes storing information for identifying a function OFF option, and the type attribute modifying further includes modifying the type attribute of the selection component to a value considering whether the selection component includes the function OFF option whose display attribute is set to the hide status.

15. The method according to claim 13, wherein a lower selection component is provided in association with the options of the selection component so that the selection components are hierarchically displayed on the operation screen, the storing includes storing, when the lower selection component is provided, a type attribute of the lower selection component and a display attribute of each of the options of the lower selection component, and the type attribute modifying further includes modifying the type attribute of the selection component having the options an appropriate value when a value of the display attribute of any of the options is changed, based on whether the selection component has a higher selection component.

16. A computer program product comprising a computer-usable medium having computer-readable program codes embodied in the medium that when executed cause a computer to execute:

storing a type attribute indicating a type of a selection component for defining how the selection component having a plurality of options is to be displayed on the operation screen and a display attribute indicating a show/hide status of an operation component representing each of the options;

display attribute modifying including modifying a value of the display attribute according to an operation from a user; and type attribute modifying including modifying, when a value of the display attribute of any of the options is changed, the type attribute of the selection component having the option to an appropriate value depending on number of the options whose display attributes are set to the show status.

17. The computer program product according to claim 16, wherein the storing includes storing information for identifying a function OFF option, and the type attribute modifying further includes modifying the type attribute of the selection component to a value considering whether the selection component includes the function OFF option whose display attribute is set to the hide status.

18. The computer program product according to claim 16, wherein a lower selection component is provided in association with the options of the selection component so that the selection components are hierarchically displayed on the operation screen, the storing includes storing, when the lower selection component is provided, a type attribute of the lower selection component and a display attribute of each of the options of the lower selection component, and the type attribute modifying further includes modifying the type attribute of the selection component having the options an appropriate value when a value of the display attribute of any of the options is changed, based on whether the selection component has a higher selection component.

* * * * *